US00RE34357E

United States Patent [19]

Eckert et al.

[11] E Patent Number: Re. 34,357

[45] Reissued Date of Patent: Aug. 24, 1993

[54] LOOSE-LAY AND ADHERED SURFACE COVERINGS

[75] Inventors: Donald C. Eckert, Lancaster; J. Richard George; George L. Lilley, both of Rapho Township, Lancaster County; Darryl L. Sensenig, Manor Township, Lancaster County; James A. Tshudy, Ephrata Township, Lancaster County, all of Pa.

[73] Assignee: Armstrong World Industries, Inc., Lancaster, Pa.

[21] Appl. No.: 541,133

[22] Filed: Jun. 20, 1990

Related U.S. Patent Documents

Reissue of:

[64] Patent No.: 4,654,244
Issued: Mar. 31, 1987
Appl. No.: 634,145
Filed: Jul. 27, 1984

U.S. Applications:

[63] Continuation-in-part of Ser. No. 508,884, Jun. 29, 1983, abandoned, which is a continuation-in-part of Ser. No. 400,437, Jul. 26, 1982, abandoned, which is a continuation-in-part of Ser. No. 335,190, Dec. 28, 1981, abandoned.

[51] Int. Cl.[5] ..... B32B 3/14

[52] U.S. Cl. ..... 428/47; 428/219; 428/246

[58] Field of Search ..... 428/47, 219, 246

[56] References Cited

U.S. PATENT DOCUMENTS

| | | | |
|---|---|---|---|
| 3,001,902 | 9/1961 | Cooke et al. | 154/45.9 |
| 3,364,058 | 1/1968 | Wagner et al. | 117/70 |
| 3,607,589 | 9/1971 | Schirtzinger | 161/55 |
| 3,821,059 | 6/1974 | Hensel | 116/36 |
| 3,847,647 | 11/1974 | Bahlo | 428/47 |
| 3,980,511 | 9/1976 | Proucelle | 156/62.4 |
| 4,020,205 | 4/1977 | Haselbauer | 428/116 |
| 4,035,536 | 7/1977 | Morrison | 428/118 |
| 4,049,855 | 9/1977 | Cogan | 428/116 |
| 4,066,813 | 1/1978 | Winters et al. | 426/282 |
| 4,146,666 | 3/1979 | Houtlosser | 428/180 |
| 4,159,361 | 6/1979 | Schupack | 428/240 |
| 4,180,615 | 12/1979 | Bettoli | 428/47 |
| 4,242,380 | 12/1980 | Courtoy | 427/366 |
| 4,265,957 | 5/1981 | Severance et al. | 428/143 |
| 4,269,884 | 5/1981 | Della Vecchia et al. | 428/131 |
| 4,284,683 | 8/1981 | Hipchen et al. | 428/285 |

FOREIGN PATENT DOCUMENTS

| | | |
|---|---|---|
| 1525018 | 9/1978 | United Kingdom . |
| 2012618 | 8/1979 | United Kingdom . |
| 2018618 | 10/1979 | United Kingdom . |
| 2019253 | 10/1979 | United Kingdom . |

OTHER PUBLICATIONS

Kerr, A. D.; "A Model Study for Vertical Track Buckling"; High Speed Ground Transportation Journal; vol. VII, No. 3-1973.

Humpreys, E. A., et al.; "Properties Analysis of Laminates"; *Engineering Materials Handbook;* vol. 1; Composites; pp. 218-235, 351-368.

*Primary Examiner*—George F. Lesmes

[57] ABSTRACT

The present invention concerns loose-lay floor structures comprising at least two layers of reinforcing material and processes to design and produce them. Loose-lay floors may be designed which will be suitable for use over stable subfloors, or which will accommodate the movement of very unstable subfloors. Flooring constructed according to this invention will have the ability to resist buckling, curling and doming, and will resist moving under a rolling load. A process is also provided for modifying structures comprising a single reinforcing layer in situ so as to convert structures with unacceptable buckling characteristics into structures with acceptable buckling characteristics. As an alternative, the reinforcing layer may be premodified such that, when used to provide a surface covering, the covering will have acceptable buckling characteristics. In appropriate circumstances, surface coverings of the present invention may also be adhered to subsurfaces, and processes are described wherein the required adhesive capacity of an adhesive can be calculated.

133 Claims, 11 Drawing Sheets

LOOSE-LAY AND ADHERED SURFACE COVERINGS

Matter enclosed in heavy brackets [ ] appears in the original patent but forms no part of this reissue specification; matter printed in italics indicates the additions made by reissue.

This application is a continuation-in-part of our copending application Ser. No. 508,884 filed June 29, 1983, now abandoned, which is a continuation-in-part of application Ser. No. 400,437 filed July 26, 1982, now abandoned, which is a continuation-in-part of our copending application Ser. No. 335,190 filed Dec. 28, 1981, now abandoned.

The present invention relates to loose-lay and adhered surface coverings, and more particularly to loose-lay and adhered surface coverings which will be suitable for use over stable or unstable subsurfaces.

BACKGROUND OF THE INVENTION

Decorative floor coverings comprising resilient material have been in use for many years. Usually these floor coverings have been fastened to subfloors with adhesives; however, the installation of such coverings is time consuming and expensive. Therefore, it is desirable to place the floor coverings on subfloors without the use of adhesives; i.e., to loosely lay the covering on the subfloor. In such circumstances, the weight of the loose-lay floor covering itself tends to hold it in place, although it may also be pinned to the subfloor by furniture, appliances, and other objects which rest upon it.

Loose lay floor coverings should have the following characteristics; namely, they should not curl or dome; they should not shirk or grow with time or under the influence of environmental change; they should stay in place under the influence of a rolling load; and they should withstand or accommodate the movement of subfloors without buckling. The latter problem creates special difficulties because subfloors range from those which are dimensionally stable (e.g. concrete) to those which are dimensionally unstable (e.g. particleboard). Other problems are also encountered depending on the type of subfloor over which the loose-lay floor is placed. Thus, the flooring industry has dedicated a considerable amount of time and effort to develop a loose-lay flooring which will have the aforementioned characteristics.

PRIOR ART

Various references are found in the prior art pertaining to loose lay flooring. U.S. Pat. No. 3,821,059 discloses segmentally accommodating loose-lay flooring comprising a plurality of rigid elements that distribute stresses within the flooring matrix such that they appear as a series of small distortions. U.S. Pat. No. 3,364,058 discloses a composite floor comprising a base support, a release coat, a waterproofing coat, a wear coat, and a top layer, said composite floor being designed to avoid damage caused by the movement of the subflooring. U.S. Pat. No. 4,066,813 discloses a method for reducing growth properties of resilient flooring having a fibrous cellulosic backing by incorporating a small amount of a growth inhibitor. In addition, a variety of patents address the problem of stress relief by inclusion of a series of deformable geometric configurations into structural matrices. Examples of such are U.S. Pat. Nos. 4,146,666; 4,049,855; 4,035,536; and 4,020,205. Nevertheless, none of the prior art references adequately teach how to construct a flooring material which may be loosely laid over the surface of a stable or unstable subfloor.

Accordingly, one objective of the present invention is to provide processes for designing and constructing a loose-lay floor structure which will accommodate the movement of an unstable subfloor without buckling.

Another objective of the present invention is to provide processes for designing and constructing a loose-lay floor structure which will accommodate the movement of any type of subfloor without buckling, doming and curling, and which will not move under a rolling load.

Yet another objective of the present invention is to provide a process by which a flooring material having predictable subfloor accommodation characteristics may be designed.

Still another objective of the present invention is to provide floor structures which will have the aforementioned attributes.

Still yet another objective of the present invention is to provide methods by which products comprising one or more reinforcing layers may be modified in situ to provide buckling characteristics which allow the products to be used as loose-lay or adhered surface coverings.

These and other advantages of the present invention will become apparent from the detailed description of the preferred embodiments which follow.

SUMMARY OF THE INVENTION

Figure 1A:
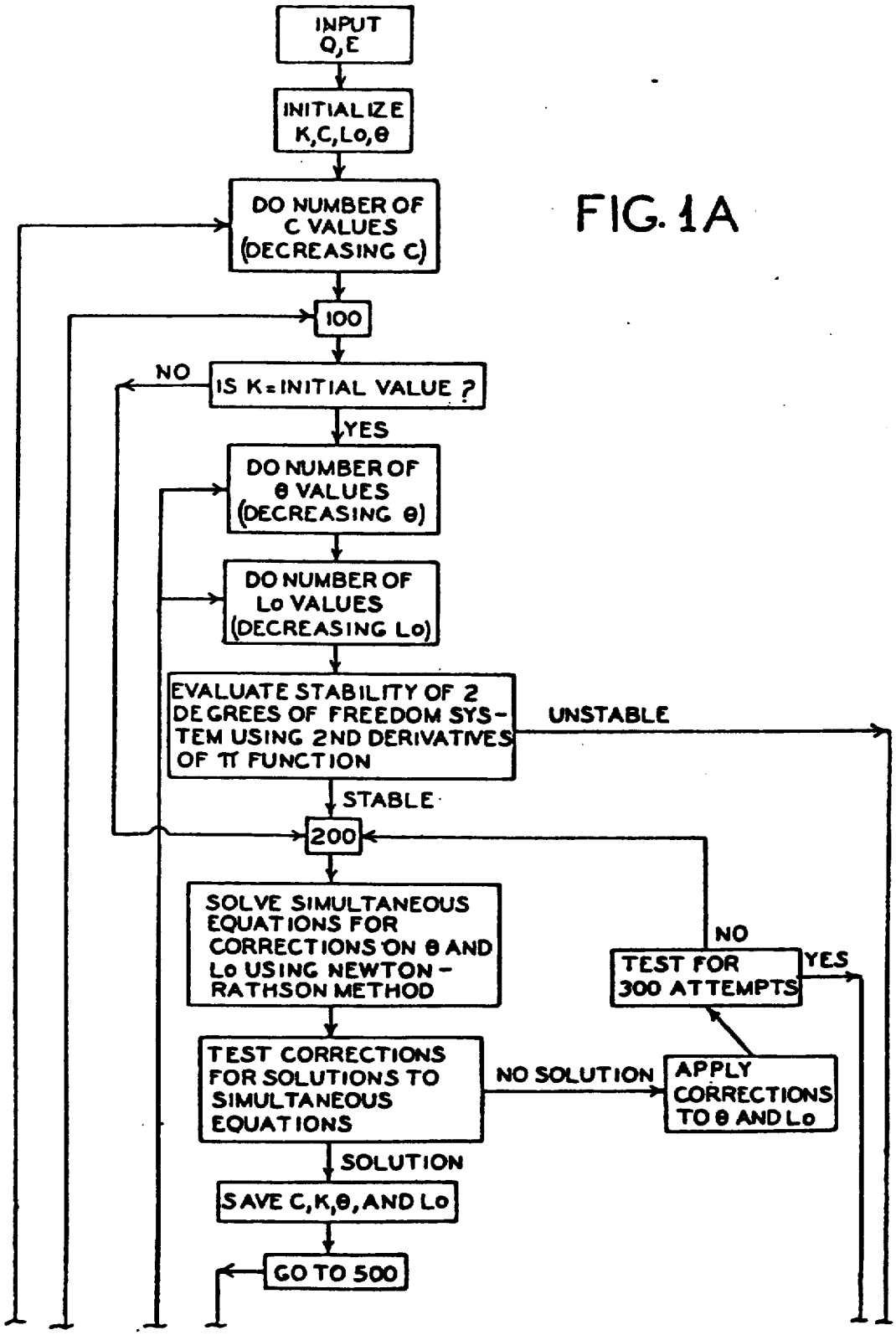
FIGS. 1A and 1B illustrate a diagram of a computer program which may be used to calculate the contour curves of the present invention.

The present invention concerns loose-lay floor structures comprising at least two layers of reinforcing material and processes to design and produce them. Loose-lay floors may be designed which will be suitable for use over stable subfloors, or which will accommodate the movement of very unstable subfloors. Flooring constructed according to this invention will have the ability to resist buckling, curling and doming, and will resist moving under a rolling load. A process is also provided for modifying structures comprising a single reinforcing layer in situ so as to convert structures with unacceptable buckling characteristics into structures with acceptable buckling characteristics. As an alternative, the reinforcing layer may be premodified such that, when used to provide a surface covering, the covering will have acceptable buckling characteristics. In appropriate circumstances, surface coverings of the present invention may also be adhered to subsurfaces, and processes are described wherein the required adhesive capacity of an adhesive can be calculated.

DETAILED DESCRIPTION OF PREFERRED EMBODIMENTS

In one embodiment, the present invention relates to a process for designing a resilient loose-lay floor structure for use over subflooring having an ascertainable subfloor dimensional change. Said process comprises the steps of selecting a target critical buckle strain for said floor structure, said critical buckle strain being greater than the subfloor dimensional change; selecting an approximate basis weight for said floor structure, said basis weight being within the range of from about 2 to about 10 pounds per square yard; plotting a contour curve of the selected critical buckle strain for said selected basis weight by varying the bending stiffness values from about 0 to about 9 inch-pounds and by varying the relaxed compressive stiffness values from about 0 to about 10,000 pounds per inch of width; determining from said contour curve the range defined by the minimum and maximum relaxed compressive stiffness values corresponding to bending stiffness values of about 0.1 and about 9 inch-pounds, respectively; selecting a matrix material and at least two layers of reinforcing material such that the sum of the relaxed compressive stiffness values for said materials falls within the determined range, said matrix material and said reinforcing materials being selected such that the sum of the relaxed compressive stiffness values for said reinforcing materials is not less than the sum of the relaxed compressive stiffness values for said matrix material; and determining from said contour curve the bending stiffness value applicable to the sum of the relaxed compressive stiffness values for said reinforcing materials and said matrix material, whereby, when said layers of reinforcing material are disposed within said matrix material such that the measured bending stiffness of the resultant floor structure corresponds to the determined bending stiffness, at least one reinforcing layer being approximately above the neutral bending plane of said resultant floor structure and at least one reinforcing layer being approximately below said neutral bending plane, the critical buckle strain for said resultant floor structure will be approximately equivalent to the target critical buckle strain and will be greater than the strain expected to be caused by the subfloor dimensional change.

In a second embodiment, the present invention relates to a process for making a resilient loose-lay floor structure for use over a subfloor having an ascertainable subfloor dimensional change. Said process comprises the steps of selecting a matrix material and at least one reinforcing material, and disposing at least two layers of reinforcing material within said matrix material such that the bending stiffness of said loose-lay floor structure is from about 0.1 to about 9 inch-pounds, at least one layer of reinforcing material being approximately above the neutral bending plane of said loose-lay floor structure and at least one layer of reinforcing material being approximately below said neutral bending plane, said matrix material and said reinforcing materials being selected such that the sum of the relaxed compressive stiffness values for said reinforcing materials is not less than the relaxed compressive stiffness value for said matrix material and the basis weight of said floor structure is from about 2 to about 10 pounds per square yard, whereby the critical buckle strain of said loose-lay floor structure is greater than the strain expected to be caused by the subfloor dimensional change.

In a third embodiment, the present invention relates to a resilient loose-lay floor structure for use over a subfloor having an ascertainable subfloor dimensional change. Said floor structure has a basis weight of from about 2 to about 10 pounds per square yard and comprises a matrix material and at least two layers of reinforcing material disposed within said matrix material, at least one of said layers being approximately above the neutral bending plane of said loose-lay floor structure and at least one of said layers being approximately below said neutral bending plane. The sum of the relaxed compressive stiffness values for said reinforcing materials is not less than the sum of the relaxed compressive stiffness values for said matrix materials. Said floor structure has a bending stiffness of from about 0.1 to about 9 inch-pounds and a critical buckle strain greater than the strain expected to be caused by the subfloor dimensional change.

In a fourth embodiment, the present invention comprises a process for treating a potential resilient loose-lay floor structure having a basis weight of from about 2 to about 10 pounds per square yard and having at least two layers of reinforcing material disposed within a matrix material, at least one layer of reinforcing material being approximately above the neutral bending plane of said floor structure and at least one layer of reinforcing material being approximately below said neutral bending plane, said structure being unsuitable for use as a loose-lay floor structure over a subfloor having an ascertained subfloor dimensional change because it has a bending stiffness which is in excess of about 9 inch-pounds, or a critical buckle strain which is not greater than the asertained subfloor dimensional change, or both, said process comprising the modification of at least one of said reinforcing layers by external means such that the bending stiffness of the resultant flooring structure is within the range of from about 0.1 to about 9 inch-pounds and the critical buckle strain of said resultant flooring structure is greater than said ascertained subfloor dimensional change.

In a fifth embodiment, the present invention comprises a process for preparing a flooring structure comprising a single reinforcing layer, said structure being suitable to accommodate the subfloor movement of a subfloor having an ascertainable subfloor dimensional change, said process comprising the steps of selecting a flooring structure comprising a single encapsulated glass reinforcing layer, the critical buckle strain of said structure being less than the subfloor dimensional change, and modifying said flooring structure in situ such that the critical buckle strain becomes greater than said subfloor dimensional change.

In a sixth embodiment, the present invention comprises a flooring structure comprising a single reinforcing layer, said structure having been modified in situ such that its critical buckle strain is greater than the subfloor dimensional change of the subfloor over which said structure will be used.

In a seventh embodiment, the present invention comprises a process for adhering a surface covering to a subsurface having an ascertainable subsurface dimensional change such that said surface covering will accommodate subsurface movement without buckling, said process comprising the steps of (a) selecting a surface covering, the critical buckle strain of the selected covering being less than the subsurface dimensional change; (b) selecting a target critical buckle strain which is greater than the subsurface dimensional change; (c) measuring the relaxed compressive stiffness, the bending stiffness, and the basis weight of said selected covering; (d) calculating tne adhered basis weight for a surface covering having the measured bending stiffness, the measured relaxed compressive stiffness, and a critical buckle strain which is equal to the target critical buckle strain; (e) calculating the minimum adhesive strength which will be necessary to adhere said surface covering to said subsurface in a manner which will prevent buckling; (f) selecting a suitable adhesive, and (g) adhering said surface covering to said subsurface.

In an eighth embodiment, the present invention comprises a process for modifying a surface covering comprising at least one reinforcing layer whereby it can be adhered without buckling to a subsurface having an ascertainable subsurface dimensional change, said process comprising the steps of (a) selecting a surface covering comprising at least one reinforcing layer, the critical buckle strain of said selected covering being less than the subsurface dimensional change; (b) selecting an adhesive having a determined adhesive strength; (c) measuring the basis weight, the bending stiffness and the relaxed compressive stiffness of said selected covering; (d) selecting a target critical buckle strain which is greater than the subfloor dimensional change; (e) calculating the adhered basis weight which would be obtained if said selected covering were adhered to said subsurface using said adhesive; (f) calculating the relaxed compressive stiffness for a modified surface covering having the measured bending stiffness, the calculated adhered basis weight, and a critical buckle strain which is equal to the target critical buckle strain, and (g) modifying said covering in situ such that it has a relaxed compressive stiffness which is not greater than the calculated relaxed compressive stiffness value, whereby when the modified surface covering is adhered to said subsurface using said adhesive, it will accommodate subsurface movement without buckling.

In a ninth embodiment, the present invention comprises a process for modifying a surface covering comprising at least one reinforcing layer, the modified covering being suitable to accommodate the subsurface movement of a subsurface having an ascertainable subsurface dimensional change when said modified covering is adhered to said subsurface, said process comprising the steps of (a) selecting a surface covering comprising at least one reinforcing layer, the critical buckle strain of said selected covering being less than the subsurface dimensional change; (b) modifying said covering in situ such that the critical buckle strain of the modified covering is greater than the initially measured critical buckle strain, but less than the critical buckle strain which would equal or exceed the subsurface dimensional change; (c) selecting a target critical buckle strain which is greater than the subsurface dimensional change; (d) measuring the bending stiffness, relaxed compressive stiffness and basis weight of said modified covering; (e) calculating the adhered basis weight for a covering having the measured bending stiffness, the measured relaxed compressive stiffness, and a critical buckle strain that is equal to the target critical buckle strain; and (f) calculating the minimum adhesive strength necessary to adhere said modified covering to said subsurface, whereby when a suitable adhesive having an adhesive strength at least as great as said calculated adhesive strength is selected, said modified structure can be adhered to said subsurface in a manner which will prevent buckling.

In a tenth embodiment, the present invention relates to a surface covering which is suitable to be adhered with an adhesive to a subsurface without buckling, said surface covering comprising (a) a matrix material, and (b) at least one reinforcing layer disposed therein which has been modified in situ such that said surface covering has a critical buckle strain which is less than the subsurface dimensional change of said subsurface, the difference between said buckle strain and said subsurface dimensional change being such that the adhesive strength of a selected adhesive in combination with the basis weight of said surface covering will be sufficient to provide an adhesive bond having a strength which is not less than the adhered basis weight calculated for said surface covering.

In an eleventh embodiment, the present invention relates to a composite structure comprising a surface covering, a subsurface and an adhesive which adheres said surface covering and said subsurface together, said surface covering comprising (a) a matrix material, and (b) at least one reinforcing layer disposed therein which has been modified in situ, the critical buckle strain of said surface covering being less than the subsurface dimensional change of said subsurface, the difference between said critical buckle strain and said subsurface dimensional change being such that the adhesive strength of said adhesive in combination with the basis weight of said surface covering provides an adhesive bond having a strength which is not less than the adhered basis weight calculated for said surface covering.

In a twelfth embodiment, the present invention relates to a flooring structure, said structure comprising a matrix material, and a single reinforcing layer embedded within said matrix material, said layer comprising regions of differential relaxed compressive/tensile stiffness such that said structure has a critical buckle strain in excess of the subfloor dimensional change of a subfloor having an ascertainable subfloor dimensional change, said structure being suitable to accommodate the movement of said subfloor.

In a thirteenth embodiment, the present invention relates to a process for preparing a flooring structure comprising a single reinforcing layer, said structure being suitable to accommodate the subfloor movement of a subfloor having an ascertainable subfloor dimensional change, said process comprising the steps of selecting a matrix material for said structure, said matrix material being capable of providing a desired basis weight for said structure, selecting a reinforcing layer, said layer having regions of differential relaxed compressive/tensile stiffness such that, when said structure is formed from said material and said layer, said structure will have a critical buckle strain greater than said subfloor dimensional change, and embedding said reinforcing layer in said matrix material.

In a fourteenth embodiment, the present invention relates to a process for preparing a flooring structure comprising a single reinforcing layer, said structure being suitable to accommodate the subfloor movement of a subfloor having an ascertainable subfloor dimensional change, said process comprising the steps of selecting a target critical buckle strain for said structure, said target critical buckle strain being greater than the subfloor dimensional change, selecting a reinforcing layer and a matrix material such that a floor covering having a desired basis weight can be produced, determining the critical buckle strain for a floor covering constructed from said layer and said material, imparting regions of differential relaxed compressive/tensile stiffness to said reinforcing layer, whereby when a structure is prepared from said modified layer and said matrix material, said structure will have a critical buckle strain which is not less than said target critical buckle strain, and constructing said flooring structure.

As used herein, "loose-lay floor structure" is a floor structure which will lie tlat on a stable or unstable subfloor, which will resist doming, curling, buckling, or movement under a rolling load, which preferably has a low structural stability value as defined hereinbelow, and which need not be held in place using adhesives.

As used herein, "accommodating floor structure" is a loose-lay floor structure which will accommodate or alter its size and shape to match that of an unstable subfloor.

As used herein, "subfloor dimensional change" is a measure of the change in length of a subflooring material under the conditions of its environment. This change is expressed herein as change per unit length.

As used herein, "critical buckle strain" is the strain at which a loose-lay floor structure that is compressed in a planar fashion will buckle.

As used herein, "relaxed compressive stiffness" is the approximate compressing force per inch of width divided by the induced strain, the value of said relaxed compressive stiffness being projected to a 1000-hour load relaxation and the compressive force being applied in a planar fashion, the measurement being taken in the linear portion of the stress-strain curve.

As used herein, "relaxed tensile stiffness" is the approximate stretching force per inch of width divided by the induced strain, the value of said relaxed tensile stiffness being projected to a 1000-hour load relaxation and the stretching force being applied in a planar fashion, the measurement being taken in the linear portion of the stress-strain curve.

As used herein, "basis weight" is the weight in pounds per square yard of a loose-lay flooring material.

As used herein, "matrix material" comprises all components of a loose-lay flooring material, excluding the reinforcing material.

As used herein, "bending stiffness" is the resistance to bending demonstrated by a loose-lay flooring material as measured in inch-pounds using a cantilever beam or equivalent method.

As used herein, "bending resistance" is a material parameter used in the theoretical derivation of the potential energy expression, and characterizes the resistance of the flooring material to bending.

As used herein, "structural stability" is a measure of the change in length in percent of a flooring sample which has been heated at 180° F. for six hours and reconditioned at 73.4° F. and 50% relative humidity for one hour.

As used herein, the "neutral bending plane" of a strip of material, the ends of which are being subjected to a downward bending force, is an imaginary plane within said material above which the material is under tension and below which it is under compression.

As used herein, "in situ" (in conjunction with one or more layers of reinforcing material) refers to a disposition of the reinforcing material in the final structure, in a partially completed structure, or in a prestructure which later becomes an integral part of the final structure.

Loose-lay flooring should be expected to maintain within acceptable limits the shape and dimensions of the room in which it is placed, and it should not shrink from the walls leaving unsightly gaps. This requirement applies regardless of the nature of the subfloor. Therefore, a desirable trait for a flooring material, whether loose-lay or adhered, is that it have a structural stability under normal conditions of not more than 0.5% and preferably not more than 0.1%.

If the subflooring on which the loose-lay floor structure is to be placed is stable, the characteristics which must be demonstrated by the loose-lay floor are less stringent than for unstable subfloors since minimal dimensional changes of the subflooring result in minimal planar compressions of the floor structure. Nevertheless, problems can still be encountered which relate to doming and curling, and to movement under a rolling load.

Conversely, unstable subfloors such as particleboard dramatically increase the requirements for a loose-lay flooring because such subfloors tend to expand and contract depending on the temperature and relative humidity conditions within the structure in which the subfloor resides. During winter months, dry furnace-heated air tends to shrink unstable subfloors, whereas during humid summer months such subfloors tend to expand. A loose-lay floor structure that is laid over such a subsurface at its maximum expanded position and is pinned, attached or otherwise restricted by heavy objects such as appliances experiences a variety of stresses when the subfloor changes its dimensions. A loose-lay flooring structure constructed according to the prior art and having the required structural stability is often unable to accommodate these stresses, thus leading to doming, buckling or curling of the flooring.

Surprisingly, we have discovered that loose-lay floor structures comprising at least two layers of reinforcing material may be constructed which will meet all of the aformentioned criteria. As a general rule, loose-lay floor structures with superior accommodation characteristics result when the basis weight and the bending stiffness are increased and the compressive stiffness is lowered. Accordingly, by following processes as set forth hereinbelow, loose-lay flooring can be constructed which will have predictable characteristics when applied over a subfloor having an ascertainable subfloor dimensional change.

One factor which must be considered at the outset is the amount of variation which can be expected from a given subfloor. For example, subfloor shrinkage can be expected to place a strain on the loose-lay floor structure when it is compressed in a planar fashion by the movement of the subfloor. If a flooring structure is constructed with a critical buckle strain equivalent to the expected subfloor dimensional change and the flooring is compressed by the maximum expected shrinkage of the subfloor, it will buckle. Thus, the critical buckle strain of tne floor structure must be greater than the expected strain which will result from maximum subfloor movement. A loose-lay floor structure will experience the maximum compressive strain if it has been installed on subflooring which is in its maximum expanded condition; therefore, it should be designed to withstand this strain without buckling.

Three significant parameters will affect the tendency of the loose-lay floor structure to buckle. These are the basis weight, bending stiffness and the relaxed compressive stiffness, which were defined above. The basis weight of ordinarily used resilient flooring material usually varies from about 2 to about 10 pounds per square yard. As a general rule, the greater the instability of the subfloor, the greater the basis weight will have to be to prevent buckling because the added weight of the flooring requires an increased compressing force to induce buckling.

A second parameter is the bending stiffness of the loose-lay flooring, the bending stiffness being a measure of the ease with which the flooring will bend and buckle. Resilient sheet flooring material will normally range in stiffness from very flexible (i.e., having a bending stiffness of ca 0.1 inch-pounds) to fairly stiff (i.e., having a bending stiffness of ca 9 inch-pounds). Sheet flooring will rarely have a bending stiffness exceeding the latter value because it must be transported on rolls. Should the bending stiffness be greater than 9, problems can be encountered with cracking, bending, and folding when the flooring is wound on small diameter rolls.

The third parameter is the relaxed compressive stiffness which will be discussed in more detail below.

The essence of the present invention is that if one skilled in the art knows the amount of subfloor dimensional change that will occur, that person can design and construct a loose-lay floor structure which will have a critical buckle strain that is greater than the strain which will be exerted on the loose-lay flooring by the subfloor. Preferably, the loose-lay floor structure will also have a suitable structural stability. Using mathematical formulas derived from the theory of buckling, one or more critical buckle strain contour curves can be generated for selected basis weights by varying the relaxed compressive stiffness values and the bending stiffness values or, alternatively, the bending resistance values. For convenience, the curves displayed herein illustrate plots of bending stiffness versus relaxed compressive stiffness for constant basis weight and constant critical buckle strain values. By determining a range of applicable compressive stiffness values from the curve, appropriate matrix materials and reinforcing materials can be selected. A bending stiffness value for the floor structure can then be determined for these materials and a suitable floor structure can be constructed by appropriately disposing at least two layers of reinforcing material within said matrix material.

The relaxed compressive stiffness of the loose-lay floor structure will approximate the sum of the relaxed compressive stiffness values for the components of said flooring. Thus, by obtaining the relaxed compressive stiffness values for materials which may comprise the matrix material and the reinforcing layers, at least two of the latter to be disposed within the matrix material, appropriate materials can be selected such that the sum of the respective relaxed compressive stiffness values falls approximately within the range of relaxed compressive stiffness values indicated by the curve. The actual relaxed compressive stiffness value may then be determined by constructing a test floor structure and, using this value, the target bending stiffness value may be determined from the curve. Alternatively, the sum of the relaxed compressive (tensile) stiffness values may be used to theoretically predict the required bending stiffness. It must be recognized that results which are theoretically calculated for a flooring structure will depend to a certain extent on experimentally measured values as well as on other variables which are less predictable; therefore, some variation from the theoretically predicted results can be expected. For that reason, this latter approach is less satisfactory.

Once the desired bending stiffness has been determined, the reinforcing layers may be disposed within the matrix material such that a bending stiffness essentially equivalent to the desired bending stiffness is obtained. The loose-lay floor structure thus obtained should have a critical buckle strain capable of withstanding the strain which will be imposed on it by the subfloor.

Stiffness is a well-known characteristic which may be determined in a variety of ways. Standard tests are well known in the art. For example, ANSI/ASTM D 747, also known as the Olsen Stiffness Test, describes a standard method for determining the stiffness of plastics using a cantilever beam. For purposes of the present invention, satisfactory values may be obtained using a 1-inch span and measuring the bending moment values at a bend angle of 20°. As used herein, the bending moment determined by the Olsen Stiffness Test is equivalent to the bending stiffness.

More difficulty is encountered in obtaining relaxed compressive stiffness data for materials which may be used to construct the loose-lay floor structure. Such measurements may readily be made by conventional means for the matrix material, taking into account the relaxation of the material under stress with time. The resulting relaxed compressive stiffness values projected to 1000-hour relaxation by means well known in the art should be used to practice the present invention.

Conversely, reinforcing materials, which may be of thin, light-weight construction, usually do not lend themselves to such measurements. Therefore, the information can be estimated by measuring the relaxed tensile stiffness of the material, also taking into account the relaxation of the material under stress with time. For preferred materials, the relaxed tensile stiffness, when properly measured, will be of approximately the same magnitude as the relaxed compressive stiffness. Accordingly, relaxed tensile stiffness values may be substituted for relaxed compressive stiffness values.

The contour curves referred to above may be derived by conventional mathematical means. Theoretical models for determining buckling characteristics are well known in the art. For example, A. D. Kerr has published, among others, a paper concerning vertical track buckling in High Speed Ground Transportation Journal, 7, 351 (1973). Loose-lay floor structures are similarly amenable to such theoretical studies. Accordingly, the potential energy, $\pi$, of a sheet flooring structure after buckling may be calculated from the following formula.

$$\pi = \frac{3C\theta^2}{L_o} + QL_o^2(1 - E)\mathrm{Tan}\,\theta + KL_o[1 - (1 - E)\mathrm{Sec}\,\theta]^2 - KL_oE^2$$

where

C = bending resistance $\theta$ = angle of lift-off of the buckle

Q = basis weight

K = relaxed compressive (or tensile) stiffness $L_o$ = one half the length of the buckled area prior to application of the strain that caused the buckle E = the compressive strain applied to create the buckle The bending resistance, C, may be calculated from the bending stiffness measured according to the Olsen Stiffness Test, using the following equation $$C = \frac{M_wS}{b\phi}$$

where $M_w$ = the measured bending stiffness

Figure 1B:
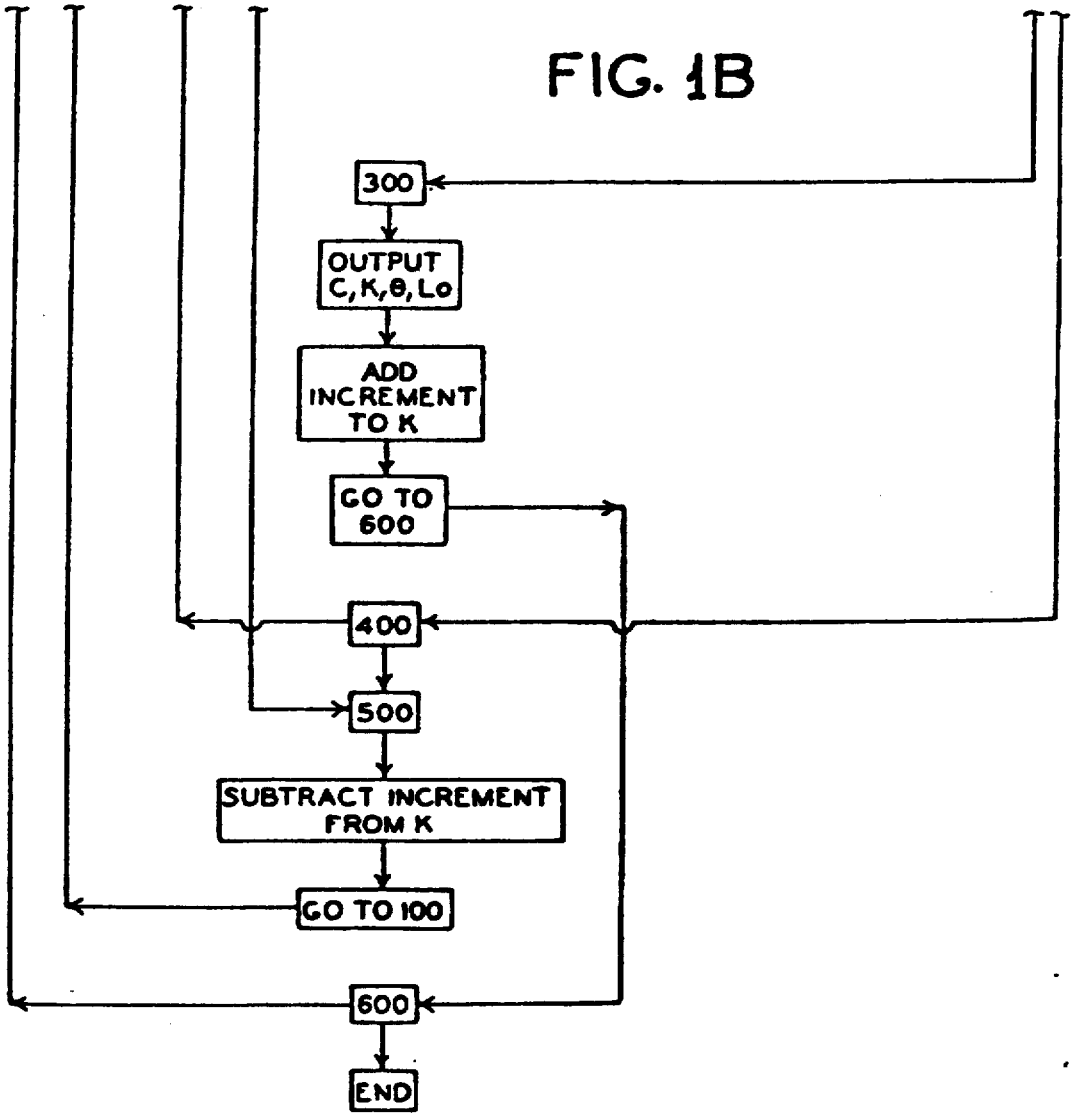

S = the span used in the test b = the width of the test specimen $\phi$ = the angle in radians at which the measurement was taken The critical buckle strain may be calculated mathematically by applying the principle of minimum potential energy. Bending stiffness values, $M_w$, are converted to bending resistance values, C. Upon setting the derivatives of $\pi$ with respect to $\theta$, and of $\pi$ with respect to $L_o$, equal to zero, assigning values for E and Q, and varying C and K within known limits, solutions can be obtained where E becomes the critical buckle strain. For example, this may be accomplished by using the Newton-Rathson Method of solving non-linear simultaneous equations. The solutions obtained by varying these bending resistance and relaxed compressive (tensile) stiffness values within known ranges yields tables of points of critical buckle strain. From these, one or more contour curves of constant critical buckle strain can be plotted for use as hereinafter described. As noted above, the contour curves illustrated herein are plotted in terms of bending stiffness, $M_w$, and relaxed compressive stiffness, K, rather than in terms of bending resistance, C, and K. The values of C used for calculation are converted from $M_w$ values. A flow chart for a computer program which may be used to generate this information is illustrated in FIGS. 1A and 1B, which must be read together. Of course it will be appreciated that parameters which are ascertainable by reference to various curves may also be determined by purely mathematical means. The use of such mathematical means to derive the information required to practice the present invention is a matter of choice to the artisan. Accordingly, language in the specification and in the claims which refers to the plotting of curves and the like will also be deemed to include such mathematical alternatives.

In practicing the present invention, loose-lay flooring may be constructed for use over a particular subfloor having an ascertained or ascertainable subfloor dimensional change, or it can be constructed for use over subflooring having an expected subfloor dimensional change. As used herein, the expression "having an ascertainable (or ascertained) subfloor dimensional change" will be considered to encompass all of these alternatives. In any event, the objective will be to construct a loose-lay floor structure which has a critical buckle strain that is sufficient to accommodate the expected subfloor dimensional change. At one extreme are very stable subfloors, such as concrete, for which the subfloor dimensional change (and hence the critical buckle strain) would be minimal. At the other extreme are very unstable subfloors, such as particleboard, for which the maximum subfloor dimensional change value (and hence the critical buckle strain) should be about 0.003.

Once the desired critical buckle strain of the flooring is known, an approximate basis weight for the flooring material can be selected. Any suitable resilient flooring material can be used, including polyvinyl chloride resin, acrylic resin, vinyl acetate resin, vinyl chloride-vinyl acetate copolymers, and the like. Furthermore, the flooring material may also comprise wear layers, decorative layers and the like. Structures comprising these materials usually have a basis weight of from about 2 to about 10 pounds per square yard, although lighter or heavier weights may be desired in certain circumstances. Since the basis weight is not critical when a loose-lay flooring is to be placed over a stable subfloor, basis weights for such usage will preferably vary from about 2 to about 5 pounds per square yard to conserve cost. Conversely, for unstable subfloors, basis weights of from about 5 to about 10 pounds per square yard will be preferred. Nevertheless, these values are provided merely as approximations and are not intended to limit the scope of the invention.

Next, using the selected basis weight, a contour curve of the desired critical buckle strain is plotted from data points obtained by varying the bending stiffness values over a range of from about 0 to about 9 inch-pounds, and by varying the relaxed compressive stiffness values over a range of from about 0 to about 10,000 pounds per inch of width.

As previously noted, the bending stiffness of resilient flooring material is usually limited by practical considerations to be within the range of from about 0.1 to about 9 inch-pounds. However, as the subfloor dimensional change increases, higher bending stiffness values will be preferred. Thus, over an unstable subfloor having a subfloor dimensional change of 0.0015, where greater accommodation of subfloor movement is required from the floor structure, higher values such as from about 1 to about 9 inch-pounds are preferred. For subfloors having a subfloor dimensional change of 0.0025 or more, a bending stiffness of from about 2 to about 9 inch-pounds is preferred, and, for subfloors having a subfloor dimensional change of 0.0030 or more, a bending stiffness of about 3 to about 9 inch-pounds is preferred.

The actual relaxed compressive stiffness range which will be applicable to the floor structure will be discernible from the contour curve and, once this range is known, matrix materials and at least two layers of reinforcing materials can be selected such that the sum of the relaxed compressive (or tensile) stiffness values for these materials falls within the indicated range. The sum of these values also gives, from the curve, the target bending stiffness for the floor structure. Thus, the reinforcing material can be disposed within the matrix material such that the target bending stiffness is achieved.

The reinforcing material will comprise fibrous materials, many of which are conventionally used in the art. Examples of such materials are fibrous mats comprising glass, polyester, rayon, nylon and the like, or combinations thereof. Very lightweight materials on the order of 0.5 ounce per square yard are preferred when constructing structures comprising two or more reinforcing layers and where little or no in situ modification is employed. Reinforcing materials used in loose-lay flooring should have a relaxed compressive stiffness which is as uniform as possible in all directions. Woven materials tend to have directional strength depending on whether the material is compressed or stretched in a machine direction or across machine direction. Such directional strength variation is minimized with non-woven materials; therefore, non-woven materials are preferred.

Specialized reinforcing materials having unique characteristics may also be used. One such non-woven material is a glass mat comprising a binder which dissolves or softens in the presence of plasticizers found in typical matrix materials. Although the use of such material makes the prediction of relaxed compressive stiffness values much more difficult, there are also advantages. For example, reinforcing materials containing soluble binders are often heavier in nature and easier to handle in a production environment than materials which do not contain such binders. Thus, they may be used where handleability is a problem, but where it is also desirable to produce a floor structure having a reduced relaxed compressive stiffness.

In the usual situation, the majority of the relaxed compressive (tensile) stiffness of the total flooring will be provided by the reinforcing material. The matrix material, being a resilient plastic, is usually not dimensionally stable and in most situations will stretch or compress quite easily. The reinforcing material, however, does not readily compress or stretch. Preferably, the relaxed compressive stiffness of the reinforcing material will be about 5 times that of the matrix material and more preferably about 10 times that of the matrix material. Suitable flooring can be made with reinforcing material and matrix material having similar relaxed compressive stiffness values. However, the sum of the relaxed compressive stiffness values for the reinforcing materials should not be less than the sum of the relaxed compressive stiffness values for the matrix materials.

The bending stiffness of a loose-lay floor structure constructed according to the present invention will vary depending on how the reinforcing layers are disposed within the matrix material. In most instances it will be desirable to have the reinforcing material disposed within the matrix material in a substantially planar fashion. However, as set forth below, it may be preferable in certain circumstances to dispose the reinforcing material in a non-planar fashion. Preferably, two reinforcing layers will be used, although suitable loose-lay flooring can be produced using single reinforcing layers or more than two reinforcing layers. The use of single layers is discussed in more detail below.

As a general rule, the greater the separation of the two layers, the greater the bending stiffness. Thus, if one reinforcing layer is disposed near the top surface of the matrix material and one is disposed near the bottom surface, the bending stiffness will be greater than if both reinforcing layers are disposed near the neutral bending plane of the composite material.

Combinations of reinforcing materials may also be used. Rather than using two layers of the same reinforcing material in a matrix material, a lighter reinforcing layer can be used in combination with a heavier reinforcing layer. The heavier reinforcing can be placed closer to the neutral bending plane, but it will still produce a bending stiffness comparable to that of a lighter weight reinforcing material disposed closer to the surface of the matrix material. Nevertheless when using heavier material, care must be taken not to exceed the desired relaxed compressive stiffness of the final product.

The use of such combinations can have great importance as, for example, where the surface of the matrix material is embossed, or where a wear layer is applied. If a lighter-weight reinforcment is placed near the surface of a matrix, embossing will tend to deform the reinforcement so that it is no longer planar, thus reducing its contribution to the relaxed compressive stiffness of the flooring structure. However, if a somewhat heavier reinforcment is used, that reinforcment could be disposed further away from the surface of the matrix, thereby diminishing the effects of the embossing. Similarly, if a wear layer with high compressive stiffness is to be applied, the neutral bending plane will be higher up in the composite structure than it would be when such a layer was not a component of the original matrix material. In such a situation, it might be necessary to place a lighter weight reinforcing material in the wear layer in order to achieve an adequate bending stiffness and relaxed compressive stiffness. Nevertheless, this problem may likewise be avoided by disposing a heavier reinforcing layer in the matrix material.

Other alternatives are also available to modify the characteristics of a flooring structure. For example, a reinforcing material has its greatest relaxed compressive/tensile stiffness when it is in a planar configuration. If the reinforcing layer is disposed in a matrix material in a non-planar fashion, or if it is modified such that a substantial portion of the reinforcing layer does not lie in the same plane, the relaxed compressive/tensile stiffness will be reduced. The former may be achieved by disposing the reinforcing within the matrix in a wavy or wrinkled manner; however, modification may be achieved in a variety of ways. For example, the reinforcing may be deformed from a planar configuration by embossing or other similar treatment.

Another means of reducing relaxed compressive/tensile stiffness of a reinforcing material is by modifying the material in a manner which does not affect planarity. For example, such modifications would include means such as perforating, cutting, punching holes, and the like, or by folding to break the fibers and then again flattening the reinforcing material. The same effect may also be achieved through the use of softenable binders, as referred to above.

In addition to modifications by which the relaxed compressive/tensile stiffness of a reinforcing material is decreased, techniques may be employed by which this parameter is increased. Reinforcing layers usually contain binders which provide added strength, and the binders are normally applied in a uniform manner either while the layer is being formed, or after it is formed; however, it is not necessary that binders be applied uniformly. For example, binders or saturants may be applied in a selected pattern such that the fibers of a web are attached together in a different manner in different regions of the web. The same effect may also be obtained if a binder is uniformly applied, but cured only in a selected pattern. As another possibility, a web in which the fibers are held together with binder, but which nevertheless has a low relaxed compressive stiffness, may be selectively treated with a saturant to fill the interstitial spaces in certain areas, thereby increasing the relaxed compressive stiffness.

Changes in relaxed compressive/tensile stiffness may also be achieved by varying the regional fiber content of a reinforcing layer. For example, layers comprising one or more fiber types may be provided with differential regions of relaxed compressive/tensile stiffness by selectively varying the mass per unit volume of the layer; i.e., by varying the mat density. Such changes may be achieved by maintaining a uniform mat thickness while varying the openness of the reinforcing. Nevertheless, these stiffness changes may also be achieved by using layers of uniform density but selectively varying the thickness of the layer. Of course, it will also be apparent that the latter result may be achieved by changing the thickness of the layer through the selective application of a second fiber type to an existing mat. From this it follows that different fiber types could be selectively applied in a pattern of abutting regions to create desired changes in relaxed compressive/tensile stiffness.

From the foregoing, it will be apparent that all manner of physical or chemical modifications may be employed, alone or in combination, to increase and/or decrease the relaxed compressive stiffness values of a reinforcing material. In essence, these modifications impart regions of differential relaxed compressive/tensile stiffness to the reinforcing layer. As a result of these regional variations, the layer exhibits an average relaxed compressive/tensile stiffness such that, when the modified layer resides in a flooring structure, the flooring structure will have a critical buckle strain which is greater than the subfloor dimensional change of the subfloor over which the flooring structure is used or intended to be used. This average relaxed compressive/tensile stiffness will, of necessity, be less than the regions of highest relaxed compressive/tensile stiffness found within the layer.

These modifications may be achieved as a matter of foresight or hindsight. Thus, a reinforcing material having a high or a low relaxed compressive stiffness value may be pretreated in such fashion that the relaxed compressive stiffness is increased or reduced to a satisfactory value, after which it may be disposed within the matrix material. Alternatively, the flooring structure may be constructed and the relaxed compressive stiffness and/or the bending stiffness measured. Adjustments can then be made by modifying one or more of the reinforcing layers in situ. In this way, flooring structures which might not otherwise be suitable for use over a given subfloor may be treated so as to impart the necessary bending stiffness and/or relaxed compressive stiffness values. It will also be apparent that, in view of the teachings herein, artisans may produce, or arrange to have suppliers produce, reinforcing materials which contain appropriate regions of differential relaxed compressive/tensile stiffness such that the layers may be utilized with no modification or minimal modification to provide flooring structures having desired performance characteristics.

The type of reinforcing material which is used and the modification (if any) which is performed on it may, in many circumstances, depend on the machinery which is used to handle it during processing. As explained above, where two reinforcing layers are used and where little or no in situ modification is employed, lightweight materials on the order of 0.5 ounce per square yard are often preferred. Nevertheless, lighter gauge reinforcing layers or premodified reinforcing layers may not have the strength to withstand normal processing conditions. For these reasons, it is often preferred to use a relatively heavy material (perhaps on the order of 2 ounces per square yard or more) and to modify the material in situ. Nevertheless, the use of lighter gauge or premodified materials is within the range of skills possessed by an ordinary artisan and is considered to be within the scope of the present invention.

This technique is also applicable to flooring structures comprising single reinforcing layers. A number of such structures have been described in the prior art. For example, U.K. Pat. No. 1,525,018 discloses structures comprising glass reinforcing layers, the density of the glass being about 80 to about 160 grams per square meter. Similarly, U.K. Patent Application Nos. 2,012,618A, 2,018,618A and 2,019,253A refer to fibrous tissues having a density of about 10 to about 60 grams per square meter. Related structures comprising encapsulated glass are also described in U.S. Pat. Nos. 4,242,380 and 3,980,511. Furthermore, structures comprising nylon, polyester and other woven and nonwoven materials are likewise known in the art.

Figure 12:
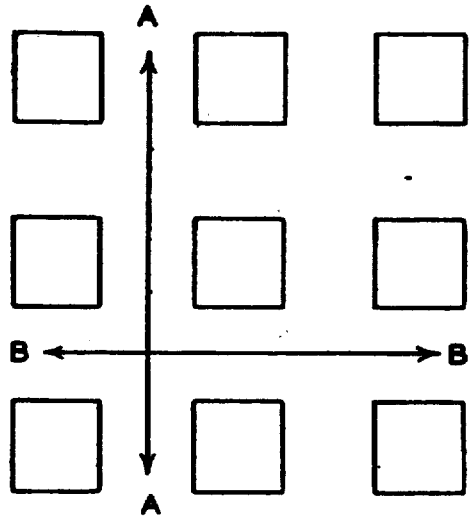
FIG. 12 illustrates one example of a continuous modification pattern.
Figure 13:
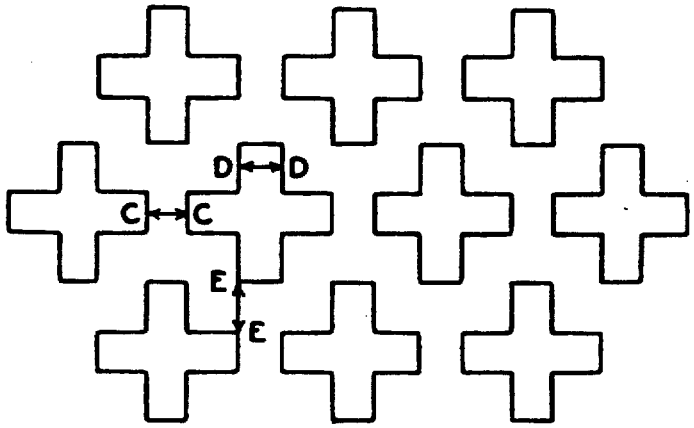
FIG. 13 illustrates one example of a modified continuous pattern.

When single heavy gauge reinforcing (e.g., 2 ounces per square yard) is used to provide adequate dimensional stability, such structures can fail when placed over unstable subfloors. Applicants have discovered that premodification of a reinforcing layer or in situ modification of the layer (or combinations thereof) may be used to advantage when preparing these structures. For example, flooring structures comprising a single layer of glass reinforcing were physically cut in various patterns, such as those illustrated in FIGS. 12–14. FIG. 12 illustrates a pattern of square cuts which were deep enough to pierce the reinforcing layer, the structure otherwise being left intact. This pattern is referred to as a continuous modification pattern because there is still a continuum of reinforcing available within the flooring structure; e.g., longitudinally along lines A—A and transversely along lines B—B of FIG. 12. A modified continuous pattern is illustrated in FIG. 13, the linear nature of the continuum of reinforcing being substantially disrupted.

Figure 14:
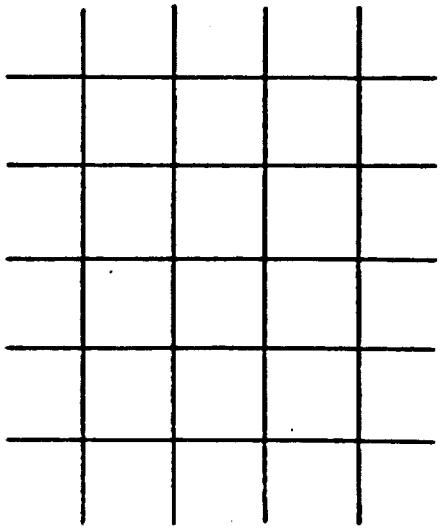
FIG. 14 illustrates one example of a discontinuous pattern.

A different type of cutting pattern referred to as a discontinuous pattern is illustrated in FIG. 14. In this instance, the cutting is accomplished in both longitudinal and transverse directions so that no continuum of reinforcing remains. It is understood, however, that the patterns disclosed herein are provided merely by way of illustration, and that other geometric designs and patterns will also provide suitable results. The selection of a particular pattern may depend on artistic preferences, as well as on structural requirements. Accordingly, the design or pattern which is selected will be largely a matter of choice to the artisan.

In situ modifications may also be accomplished by embossing-type techniques in which the application of external forces disrupts the integrity of the reinforcing layer, or, as previously described, by chemical modifications which impart differential regions of relaxed compressive stiffness. The physical modifications may readily be achieved even though the layer is already embedded in a completed structure, a partially completed structure, or even in a prestructure (such as a mat or web embedded in a plastisol) which is later made an integral part of the final structure; however, chemical modifications are more difficult to achieve on structures of this type. All such techniques are included within the definition of "modifications" as hereinbefore described.

To practice the in situ modification invention on an existing structure comprising a single reinforcing layer, essentially the same sequence of events as described earlier for more complex structures should preferably be employed. First, the instability of an actual or proposed subfloor should be considered and a desired target critical buckle strain should be selected for the end product whereby this critical buckle strain is greater than the subfloor dimensional change. The basis weight of the existing structure can then be measured and one or more curves of constant critical buckle strain can be generated by setting E equal to the desired critical buckle strain, Q equal to the basis weight and varying the bending stiffness, Mw, and the relaxed compressive stiffness, K, as hereinbefore described. The bending stiffness and the relaxed compressive stiffness of the existing structure can then be measured.

The measured relaxed compressive stiffness in most instances, and especially where the existing structure contains a very heavy or very light reinforcing material, will not be relatable to the curve corresponding to the target critical buckle strain. However, the measured bending stiffness can be used in conjunction with the curve to determine the relaxed compressive stiffness which should be demonstrated by the desired end product. Thus, if the existing structure is modified in situ so that the resulting structure has a relaxed compressive stiffness which approximates that determined from the curve, the critical buckle strain of this resulting product should be such that the structure can be used over the intended subfloor. It has been found that, by applying such techniques to structures which have unsuitable buckling characteristics, structures are produced which have extremely good performance characteristics.

Where a premodified reinforcing layer is used, the procedure will be slightly different because the layer will not be modified in situ. The target critical buckle strain will be selected in the usual manner based on the subfloor dimensional change, and the basis weight can then be selected, usually in the range of 2–10 pounds per square yard. The values for E and Q are determined based on the selected materials, and curves of constant critical buckle strain are constructed as defined above. By constructing a structure having the selected basis weight from the matrix material and the reinforcing layer, the bending stiffness of the ultimate structure can be estimated; however, as indicated below, the estimated and the actual value will be essentially the same. Once this value is known, the required relaxed compressive stiffness for the reinforcing material can be determined from the curve and the reinforcing layer can be modified as necessary.

Another aspect of the modification procedure is the effect that modification has on the structural stability of the resulting structure. It was explained above that a structural stability of not more than 0.5% was preferred, but that a structural stability of not more than about 0.1% was most preferred. The reason is that, if a flooring structure is placed in a doorway, next to a wall, or next to another piece of loose-lay flooring, it is undesirable for the structure to shrink or grow because unsightly gaps or buckles can appear. Neverthelss, if the structure is used as an area covering, structural stability may be an insignificant factor because the growth or shrinkage may not be noticeable. Accordingly, the importance of structural stability will depend on the intended use of the structure.

Modification can have a significant effect on structural stability. For example, if a reinforcing layer has a high relaxed compressive stiffness, it will impart good structural stability to a structure in which it is used, but it may also impart too low a critical buckle strain to the structure. Thus, the structure may not be capable of accommodating subfloor movement. Modification may be required in order to decrease the relaxed compressive/tensile stiffness and thus increase the critical buckle strain to a level in excess of the subfloor dimensional change. In effecting this increase in critical buckle strain, the environment in which the flooring structure will be used should be considered. For example, if an area cover is intended, the modification may be extensive such that the critical buckle strain is far in excess of the subfloor dimensional change. Should that occur, the structural stability of the structure would be quite high so that growth or shrinkage in excess of 0.5% might occur after installation. Nevertheless, because of the intended use, this level of instability would probably be unimportant.

Conversely, if significant growth or shrinkage would be undesirable, care should be taken in modifying or premodifying the reinforcing layer. A guide to the artisan in such circumstances is that the critical buckle strain of the structure in which the modified layer is used should be only slightly in excess of the subfloor dimensional change.

Although in situ modification or premodification can cause substantial increases or reductions of the relaxed compressive stiffness values, the bending stiffness values for singly reinforced structures are relatively unaffected in most instances. Thus, the initially determined bending stiffness may be used to predict the required relaxed compressive stiffness from the curve. In those uncommon instances where the bending stiffness shows a significant change, the necessary relaxed compressive stiffness value may be determined from the curve using the bending stiffness value for the modified structure.

Surprisingly, we have also discovered that the present invention is applicable to a variety of surface coverings such as sheet flooring, floor tile, wall tile, ceiling tile, and the like, wherein these surface coverings are adhered to subsurfaces using an adhesive. The same basic principles which apply to loose-lay flooring also apply to adhered surface coverings; however, certain of the definitions previously set forth herein should be expanded in scope. For example, the subsurface dimensional change as used hereafter is analogous to the subfloor dimensional change; an accomodating surface covering is one which will accommodate or alter its size and shape to match that of an unstable subsurface, even when it is adhered to the subsurface; etc.

One major modification in terminology concerns the basis weight. In the case of loose-lay flooring, the flooring is held to the subsurface by its own weight. In a ceiling tile, however, the tile would tend to be separated from the ceiling subsurface by its weight; i.e., gravity would tend to make it fall. This gravitational pull is offset by the adhesive; thus, for purposes of this application of the invention, the adhesive strength of an adhesive should be considered concurrently with the effect of gravity on the basis weight.

Several possible aspects of this are envisaged. For example, if a floor covering is considered, the adhesive strength will be enhanced by the gravitational effect on the covering; if a ceiling covering is considered, the gravitational effect will detract from the adhesive strength; and if a wall covering is considered, the adhesive strength will be relatively unaffected because the gravitational pull will tend to shear in a direction perpendicular to the adhesive strength, a situation which may be ignored for purposes of the present invention.

For convenience, the term "adhered basis weight" will be used herein to describe the calculated value which is the minimum strength necessary to adhere a surface covering to a subsurface. This value is a composite of the adhesive strength of an adhesive and the actual basis weight of a material but, in actual practice, the adhered basis weight usually will be due almost entirely to the adhesive. For example, a typical floor covering may have a basis weight of two to three pounds per square yard, whereas a typical adhesive may have an adhesive strength of two to three pounds per square inch. Accordingly, in many instances the basis weight of the surface covering will be quite small in comparison to the adhesive strength. As will be more fully explained below, the adhered basis weight may be calculated by substituting appropriate values for relaxed compressive stiffness, bending stiffness, and target critical buckle strain into the standard equation, or it may be determined by adding the actual basis weight to, or substracting it from, the adhesive strength.

Other aspects of adhesives which should be considered are their interactions with the surface coverings, the subsurfaces, and the environment in which they are used. Adhesives are often formulated for specific uses. Therefore, for purposes of the present invention, it is assumed that the artisan has the skill to select an adhesive which will show long-term compatibility with the surface covering, the subsurface, and the environment in which it is used. It must be emphasized, however, that the accurate measurement of adhesive strength is very important and, for that reason, the directions for use provided by the manufacturer of the adhesive should be precisely followed. Furthermore, the application should be made in the same way for the test and for field installation; e.g., if the directions specify that an adhesive should be applied in a particular manner with a trowel having specified groove dimensions, the application of the adhesive should be performed exactly in that manner both for the test and when the surface covering is installed over a subsurface. If the installation is not performed in the same way, the predictions obtained according to the present invention may, in many instances, be invalid.

An adhesive which is used to adhere two surfaces together has, after appropriate aging, an initial adherence strength; however, an adhesive bond usually diminishes in strength under load with time and, thus, it may eventually rupture. Because of the potential for a decrease in adhesive strength with time, it has been found that the adhesive strength which should be used when practicing the present invention is the adhesive strength under load in a given environment. This value is defined as the approximate force per square inch (or per square yard) at which the adhesive will fail. It preferably is calculated using the bending stiffness, relaxed compressive stiffness and actual basis weight of a given surface covering in combination with the "adhered critical buckle strain." This latter term may be defined as the strain at which a surface covering that is adhered to a subsurface with a given adhesive will buckle when compressed in a planar fashion. For the reasons set forth herein, an adhered critical buckle strain value is usually applicable only to the surface covering/adhesive/subsurface system for which it is measured.

Although adhesive strength may be determined in a number of different ways, the adhesive strength of an adhesive may be conveniently determined for a given surface covering/subsurface system by preparing test strips of surface coverings adhered to subsurface materials which have been conditioned at high relative humidity and temperature (e.g., 80°-100° F.). When the adhered systems are subjected to drying conditions at low relative humidity, a strain is induced in the surface covering material. The tendency to buckle caused by the compressive strain which is introduced into the surface covering by subsurface shrinkage is usually compensated for by the adhesive; however, in many situations the adhesive eventually fails and the surface covering buckles. The strain at which this occurs is the adhered critical buckle strain of the system, and it is a measurable value. Consequently, it may be used to calculate the adhesive strength as illustrated in the examples. In appropriate circumstances, the adhesive strength value may also be projected mathematically or graphically from other adhesive strength data.

Three types of rupture are possible, namely, rupture of the adhesive itself, which is a loss of cohesive strength; rupture of the bond between the adhesive and the test subsurface; and rupture of the bond between the test surface backing and the adhesive. A determination of the type of rupture is not a feature of the present invention; however, it is information which is often useful to the artisan.

Because, in this aspect of the invention, the surface coverings are adhered to a subsurface with an adhesive, several of the calculation limits suggested for loose-lay flooring no longer apply. For example, floor tile and wall tile normally would not be rolled, and the sugested bending stiffness upper limit of ca 9 inch-pounds for loose-lay flooring would not be applicable to tile. Bending stiffness values in excess of 20 inch-pounds have been measured for flooring tiles; however, by extending the bending stiffness limits used in the calculations, suitable adhesive strengths have been determined. From this it will be apparent that the suggested ranges used in the calculations may be expanded as necessary to be compatible with the materials under consideration, and that the extensions of these ranges will not adversely affect the calculated results.

In practicing the present invention, a number of alternatives are possible, as suggested by the following hypothetical situations: (1) a situation where the surface covering is used as is, and the minimum strength of the adhesive is calculated to ensure firm adherence; (2) a situation where an adhesive is selected and the surface covering is then modified to provide at least minimal performance characteristics in combination with the adhesive; and (3) a situation where a surface covering is selected and modified, and the minimum adhesive requirement is determined so that an appropriate adhesive can be selected. Of course, these situations are provided by way of illustration, and not by way of limitation.

In the first-described hypothetical situation, no modification occurs to the surface covering and it is adhered to the subsurface by using an adhesive having appropriate strength. In the past, the selection of an appropriate adhesive was quite difficult to achieve. As explained above, although an adhesive may initially perform suitably in a given environment, the adhesive may fail under load with time. This may be due to a number of factors, such as changes in the adhesive or adhesive strength caused by the environment (e.g., dampness), or to the buckling tendencies of certain surface coverings when placed over unstable subsurfaces. For these reasons, actual testing of adhered surface covering/subsurface systems will preferably be conducted as previously described during which the climate is changed from humid, summer-like to dry, winter-like conditions. These determinations can be made even for adhesives which change substantially with time, provided that the manner of change can be quantified, and in addition, the present invention will also permit one skilled in the art to find other alternatives of a suitable adhesive cannot be found.

To practice this first-described aspect of the invention, it is first necessary to estimate what subsurface dimensional change is anticipated, and then to assess the performance characteristics of the surface covering by measuring its bending stiffness, basis weight and relaxed tensile stiffness. The critical buckle strain of the covering is then calculated in the usual manner. If the critical buckle strain is greater than the subsurface dimensional change, the situation falls within the scope of the loose-lay flooring situation previously described; i.e., no adhesive would be necessary unless the surface covering were to be used as a ceiling or a wall covering. However, if it is less than the subsurface dimensional change, the necessary minimum adhesive strength can be calculated. This may be done by selecting a target critical buckle strain in excess of the subsurface dimensional change; then, using this target value and the measured bending stiffness and relaxed compressive stiffness values, the adhered basis weight of the structure is calculated.

As applied to this hypothetical situation, the adhered basis weight is a value which incorporates two parameters, the actual basis weight of the surface covering and the minimum required adhesive strength of the adhesive. For example, if the structure is a ceiling tile, the basis weight of the tile would act counter to the adhesive; thus, the minimum adhesive strength required for the adhesive would be the calculated adhered basis weight plus the actual basis weight. Conversely, if the structure is a floor structure, the basis weight would act in concert with the adhesive; thus, the minimum adhesive strength would be the calculated adhered basis weight less the actual basis weight. As an added consideration, it should also be recognized that the calculated adhesive strength is that which is necessary to minimally overcome the factors which would tend to cause the surface covering to separate from the subsurface. Accordingly, in this, as well as other situations, it may be advisable to select an adhesive having a greater-than-required adhesive strength so as to overcome unforeseen factors such as detrimental environmental effects, loss of strength due to plasticizer migration, and the like.

In the second hypothetical situation, the surface covering and the adhesive are selected, and the adhesive strength is determined as previously described. The bending stiffness, basis weight and relaxed compressive stiffness are measured for the unmodified surface covering, and an appropriate target critical buckle strain, in excess of the subsurface dimensional change, is selected. The adhered basis weight is determined depending on the intended use by combining the basis weight and the strength of the adhesive in an appropriate manner, as referred to above. The desired relaxed compressive stiffness can then be calculated using these data. From this information, the surface covering is modified in situ as previously described to give, ideally, a structure having the calculated relaxed compressive stiffness. Of course, safety factors may be included in these calculations, as previously suggested.

The third hypothetical situation set forth above relates to a comparable situation, except that the modification is achieved first and then the minimum adhesive strength is determined by making the necessary calculations.

The manner in which the in situ modifications may be achieved was referred to earlier; however, it is emphasized that modifications may be performed in a variety of ways. For example, modification may be performed on intact coverings or on partially constructed coverings which are later converted to surface coverings having defined characteristics. Based on practical performance criteria, it appears to be preferred to modify the structure and then apply the back coat because the back coat usually seals the structure. This is especially true where seepage into an open structure might occur. Of course, the required degree of modification may also be determined by estimating the characteristics of individual components or combinations of individual components, or it may be achieved by evaluating composite structures and then back-calculating the characteristics which will be needed in future structures.

The present invention has the advantage of providing a relatively reliable way to predict the characteristics of loose-lay flooring structures and adhered surface coverings, and it also provides guidelines by which the various parameters may be modified so as to predictably alter the characteristics of such structures and surface coverings.

The following examples will be illustrative to demonstrate, but not to limit, the advantages of the present invention.

EXAMPLES

Structures Comprising At Least Two Reinforcing Layers

Example 1

Figure 2:
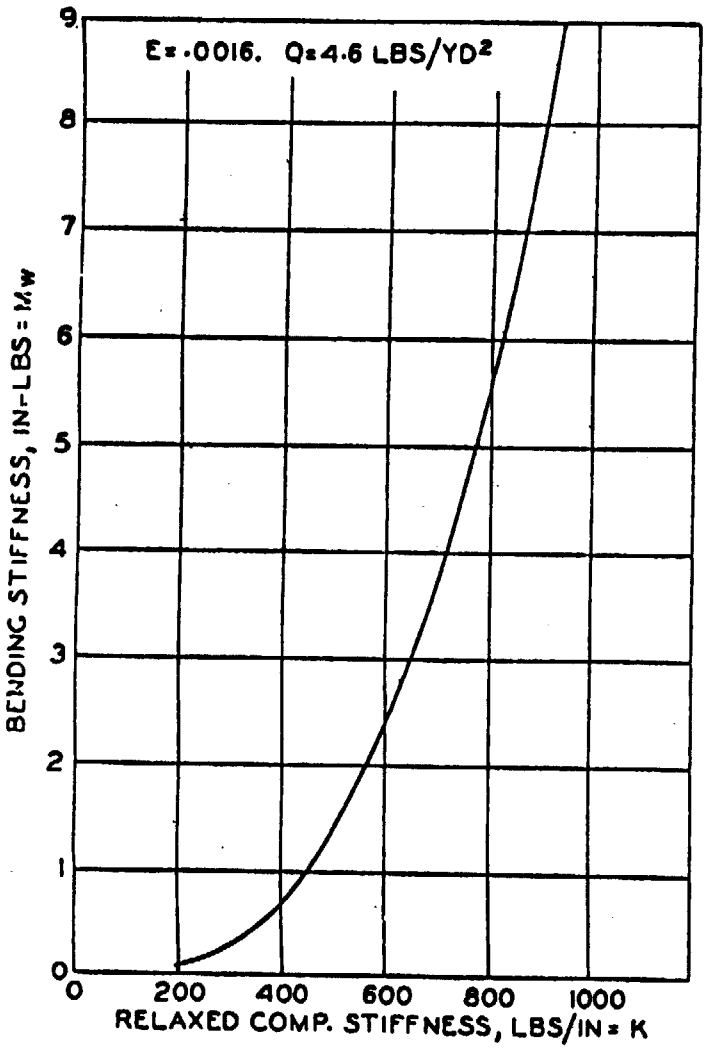
FIG. 2 illustrates the contour curve of Example 1.

This example illustrates a process for designing a loose-lay flooring structure for use over a subfloor having a subfloor dimensional change of 0.001. The target critical buckle strain for the desired flooring structure is selected to be 0.0016 and the basis weight of the flooring structure is selected to be 4.6 pounds per square yard. Accordingly, for purposes of calculation, E is assigned the value of the target critical buckle strain (0.0016) and Q is assigned the basis weight (4.6 pounds square yards). By using the assigned values in the equations set forth in the specification, varying the bending resistance, C, such that the bending stiffness, $M_w$, is varied between 0 and 9 inch-pounds, varying the relaxed compressive stiffness, K, from 0 to 10,000 pounds per inch of width, and solving the resulting equations, a series of points of constant critical buckle strain corresponding to the varied values of $M_w$ and K are obtained (FIG. 2). From the curve, the relaxed compressive stiffness corresponding to the bending stiffness value of 0.1 inch-pound is 200 pounds per inch of width (ppiow) and that corresponding to 9 inch-pounds is 930 ppiow.

A reinforcing material from International Paper Co., Identification No. IP042081-2, is selected for evaluation. This material is a nonwoven mat comprised of 50% glass and 50% polyester fiber and having a weight of 0.524 ounce per square yard. The relaxed tensile stiffness of this material is measured as follows: A sample 2 inches wide and 12 inches in length is cut and clamped in the jaws of an Instron Tensile Tester such that the jaws are separated by a distance of 8 inches. The jaws are then moved apart at a rate of 0.02 inch per minute until the sample has elongated by 0.3%; i.e., the strain on the sample is 0.003. Jaw movement is stopped and the load on the sample is monitored for 90 minutes. The load decay curve is then extrapolated to 1,000 hours by means well known in the art, giving a relaxed tensile stiffness of 227 ppiow.

A PVC plastisol matrix material is prepared having the following formula:

| Component | Parts by Weight |
|---|---|
| PVC Homopolymer resin (MWt = 106,000) | 100 |
| Primary plasticizer | 45 |
| Secondary plasticizer | 15 |
| Organotin stabilizer | 2 |
| Silica gel thickener | 1 |

The relaxed tensile stiffness value measured using the Instron Tensile Tester is 74 ppiow. Therefore, the ratio of the ppiow values for the two reinforcing layers to that of the matrix material is 454:74 or 6.1:1.

The sum of the relaxed compressive stiffness values for the two layers of reinforcing material and the matrix material is 528 ppiow and, from the curve, the bending stiffness corresponding to this ppiow value is 1.65 inch-pounds. Accordingly, a flooring structure having a basis weight of 4.6 pounds per square yard should have a critical buckle strain greater than 0.001 when constructed from the above materials such that the bending stiffness is 1.65 inch-pounds, one reinforcing layer being disposed above the neutral bending plane of the resulting floor structure and the other reinforcing layer being disposed below said neutral bending plane.

To verify this, a flooring structure is constructed for testing using a high velocity air impingement oven and a reverse roll coater. A layer of vinyl matrix material 0.01 inch thick is applied to a release carrier. A layer of the reinforcing material is laid on the matrix material and allowed to saturate, after which the composite material is gelled in an oven at 275° F. for two minutes. After cooling, a second layer of matrix material 0.07 inch thick is applied to the surface of the gelled sample and this composite structure is gelled in the oven at 275° F. for two minutes. A third layer of matrix material 0.01 inch thick is applied to the gelled substrate and a second layer of reinforcing material is placed in the wet plastisol and allowed to saturate. After saturation of the mat, the composite structure is gelled in an oven at 275° F. for two minutes and then fused at 380° F. for 2.5 minutes. After cooling, the fused composite structure is pressed between platens having a temperature of 320° F. to consolidate the gauge to 0.08 inch. Pressure is maintained for 30 seconds to give a material with a basis weight of 4.58 pounds per square yard and bending stiffness, measured according to ANSI/ASTM D 747, of 1.65 inch-pounds.

To verify its suitability, a sample is placed in an environmental test chamber on a piece of particle board having a subfloor dimensional change of 0.001. The particleboard is at its maximum expanded position and the sample is affixed thereto such that, when the sample-on-subfloor combination is subjected to a 1,000-hour simulated, summer-winter seasonal change, the floor sample is subjected to the strain imposed by the movement of the subfloor. The ability of the floor structure to accommodate the imposed strain without buckling demonstrates that it has a critical buckle strain in excess of 0.001. Verification may also be achieved by using the measured basis weight, bending stiffness, and relaxed compressive stiffness values of the resulting floor structure and then calculating the critical buckle strain mathematically.

EXAMPLE 2

This example illustrates the construction of a flooring structure whereby an intermediate test structure is employed.

A foamable polyvinyl chloride plastisol matrix material having the following composition and a viscosity of 10,000 cps is prepared by means well known in the art.

| Ingredient | Parts by Weight |
|---|---|
| Dispersion Grade PVC Homopolymer Resin, MWt 105,000 | 36.00 |
| Dispersion Grade PVC Homopolymer Resin, MWt 80,400 | 36.00 |
| Blending Grade PVC Homopolymer Resin MWt 81,100 | 28.00 |
| Epoxy-type plasticizer | 1.00 |
| Dioctyl phthalate | 50.00 |
| Blowing agent activator | 0.20 |
| Stabilizer | 0.15 |
| Azodicarbonamide blowing agent | 0.66 |
| Feldspar filler | 18.00 |

The following structure is prepared for use over a subfloor having an expected subfloor dimensional change of 0.0015. The target critical buckle strain for this floor structure is selected to be 0.0018.

Figure 3:
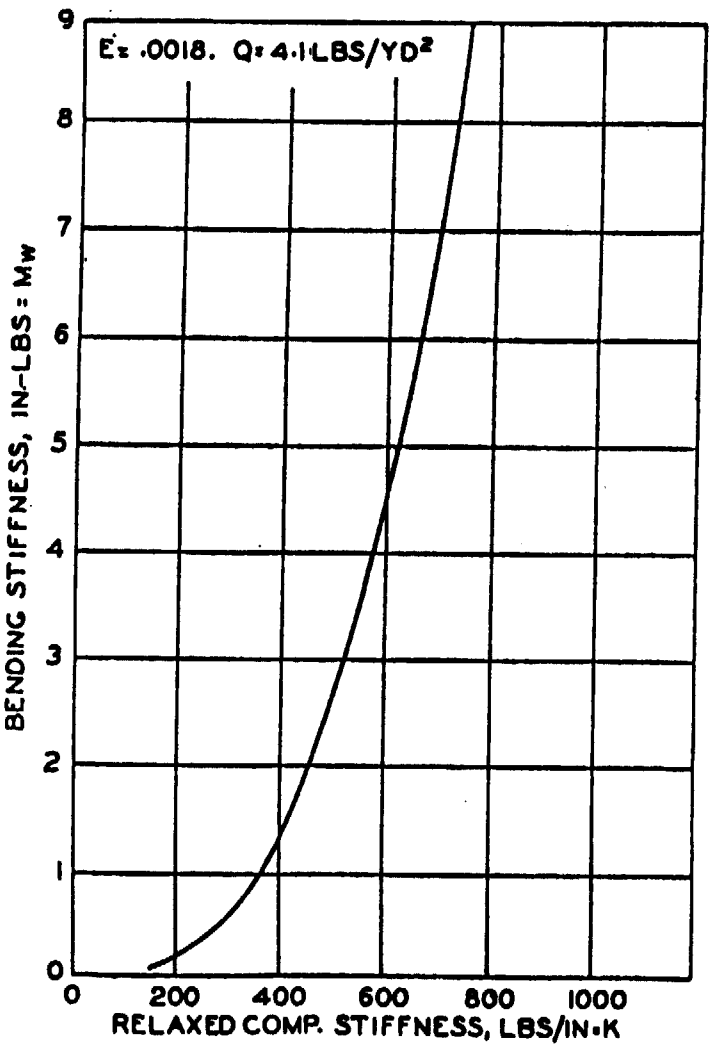
FIG. 3 illustrates the contour curve of Example 2.

The expected subfloor dimensional change of 0.0015 indicates that the subfloor is of medium stability. Therefore, a basis weight of 4.1 pounds per square yard is selected for the sample. Using these data, a contour plot is prepared as set forth in Example 1 wherein E is 0.0018, Q is 4.1 pounds per square yard, and $M_w$ and K are varied between 0 and 9 inch-pounds and 0 and 10,000 ppiow, respectively. From the plot obtained (FIG. 3), the range of relaxed compressive stiffness values corresponding to bending stiffness values of 0.1 and 9 inch-pounds is determined to be 150 to 750 pounds per inch of width.

A 50% glass fiber/50% polyester fiber reinforcing material having a basis weight of 0.524 ounce per square yard is selected, as is the matrix material described above. The relaxed tensile stiffness value for the foamed matrix is 42 pounds per inch of width whereas the value for the reinforcing material is 227 pounds per inch of width. Accordingly, because two reinforcing layers are used, the total of the relaxed tensile stiffness values is calculated to be 496 pounds per inch of width, as follows:

| Component | Relaxed Tensile Stiffness (pounds per inch of width) |
|---|---|
| Matrix material | 42 |
| First reinforcing layer ($R_1$) | 227 |
| Second reinforcing layer ($R_2$) | 227 |
| | 496 |

This value is within the range of 150 to 750 pounds per inch of width determined from the curve. Furthermore, the sum of 454 pounds per inch of width for the two reinforcements is approximately 10 times greater than the value of 42 measured for the matrix material, which is a desirable relationship.

Figure 4:
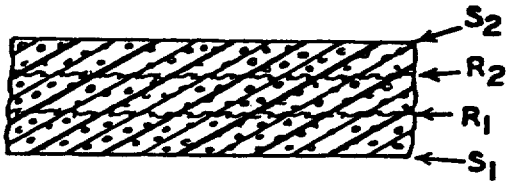
FIG. 4 illustrates a structure as set forth in Example 2.

The actual relaxed compressive stiffness of the composite structure is determined experimentally by constructing a test structure according to the following procedure. A layer of matrix material 0.027 inch thick is coated on a release carrier and one layer of the reinforcing material is placed in an approximately planar fashion on top of the wet surface. The reinforcing layer is allowed to saturate and the material is gelled at 280° F. for 1.5 minutes. After cooling, a second layer of plastisol matrix material essentially comprising the central portion of the eventual composite structure is coated at a thickness of 0.029 inch on the gelled substrate. A second layer of reinforcing material is placed in the wet plastisol and allowed to saturate, after which the material is gelled at 280° F. for 1.5 minutes. After the composite has cooled, a third coating of plastisol 0.02 inch thick is placed on the gelled surface. This composite is gelled at 280° F. for 1.5 minutes to give a structure having a thickness of 0.076 inch. When fused at 420° F., the blowing agent is activated and the structure is expanded to a final thickness of 0.117 inch. This structure is illustrated in FIG. 4 in which $R_1$ and $R_2$ are the reinforcing layers and $S_1$ and $S_2$ are the lower and upper surfaces, respectively. The relaxed compressive stiffness value of this structure is measured to be 538 pounds per inch of width as compared to the predicted relaxed tensile stiffness value of 496 pounds per inch of width.

Referring again to FIG. 3, the relaxed compressive stiffness value of 538 pounds per inch of width indicates that the bending stiffness of the finally constructed sample should be 3.3 inch-pounds. However, the bending stiffness of the test structure is measured to be 0.81 inch-pounds. This value is substantially below the desired value; therefore, a second composite is constructed. In this sample, represented by FIG. 5, the reinforcing layers are separated by a greater distance in order to increase the bending stiffness.

The procedure followed is essentially the same as that set forth above. A layer of matrix material is coated to a thickness of 0.01 inch on a release carrier and one layer of reinforcing material, $R_1$, is placed in an approximately planar fashion on top of the coated surface. When saturation is complete, the material is gelled at 280° F. for 1 minute. After cooling, a layer of matrix material 0.050 inch thick is coated on the gelled material and gelled by heating at 280° F. for 2 minutes. A third coating of plastisol 0.015 inch thick is then placed on the gelled surface and a second layer of reinforcing material, $R_2$, is placed in the wet plastisol. After saturation is complete, the material is gelled to give a composite structure having a thickness of 0.075 inch. The resulting structure is then fused at 420° F. to activate the blowing agent and expand the final structure to a thickness between $S_1$ and $S_2$ of 0.117 inch. The bending stiffness of this structure is measured to be 3.29 inch-pounds.

As noted above, this structure is intended for use over the subfloor having an expected subfloor dimensional change of 0.0015. To verify its suitability, a sample is placed on such a subfloor at its maximum expanded position and affixed to it. When the floor sample-on-subfloor combination is subjected to a simulated, 1000-hour, summer-winter seasonal change as set forth in Example 1, no buckling occurs, thus indicating that it has a critical buckle strain of greater than 0.0015.

The structural stability of this floor structure is determined by measuring the length of a sample, heating it at 180° F. for six hours, reconditioning it at 73.4° F. and 50% relative humidity for one hour, and then remeasuring the length. The percent change in length (the structure stability) is found to be −0.02%. This is a desirable value which indicates that the floor structure is dimensionally stable.

Example 3

Figure 6:
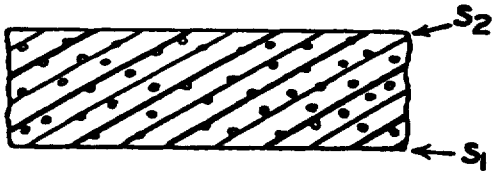
FIG. 6 illustrates a structure as set forth in Example 3.

The following additional structures are prepared to illustrate the variations in bending stiffness caused by changing the position of the reinforcing materials within the matrix. The structure of FIG. 6 is prepared in a single step process essentially as described in Example 2 except that a single layer of plastisol 0.075 inch thick is placed on the release carrier. Upon expansion, a thickness of 0.118 inch between surfaces $S_1$ and $S_2$ is obtained, and a bending stiffness of 0.20 inch-pounds is measured for this structure.

Figure 5:
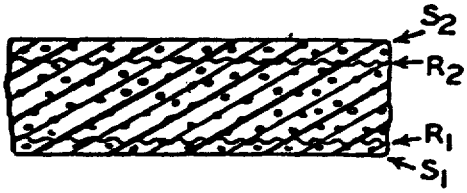
FIG. 5 illustrates a structure as set forth in Example 2.

A structure similar to that of FIG. 5 is prepared except that a Manville glass fiber mat having a basis weight of 20 grams per square meter (ca. 0.6 ounce per square yard) is employed for $R_1$ and $R_2$. When expanded to a thickness of 0.118, the structure has a bending stiffness of 5.66 inch-pounds.

Figure 7:
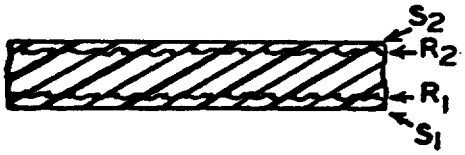
FIG. 7 illustrates a structure as set forth in Example 3.

The structure of FIG. 7 is prepared in the manner used to prepare the structure of FIG. 5 (Example 2), except that the material is not heated to expand the plastisol. The resulting unfoamed matrix has a thickness of 0.077 inch and the separation between $R_1$ and $R_2$ is 0.054 inch. The bending stiffness of this structure is 1.49 inch-pounds, which is substantially less than the value of 3.29 inch-pounds obtained for the structure of FIG. 5.

When the results obtained for these structures are compared, several generalities can be made. First, extremely low bending stiffness values are obtained in the absence of the two reinforcing layers. Secondly, comparing FIGS. 4 and 5, bending stiffness is increased when the distance between the reinforcing layers $R_1$ and $R_2$ is increased. The same result is also obtained when a relatively lighter weight reinforcing material is replaced by a heavier material. Finally, referring to FIGS. 5 and 7, bending stiffness may also be varied by controlling the amount of expansion of the matrix material.

Example 4

Figure 8:
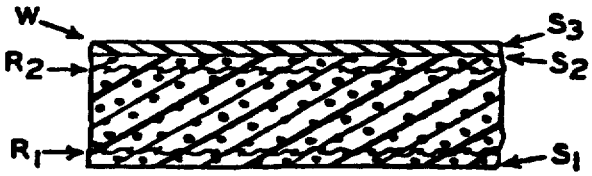
FIG. 8 illustrates a structure as set forth in Example 4.

A structure similar to that of FIG. 5 of Example 2 is prepared, the difference being that a clear PVC plastisol wear layer, W, is added to the surface of the structure. This structure is illustrated in FIG. 8 and is also designed for use over a subfloor having a subfloor dimensional change of 0.0015; therefore, a target critical buckle strain of 0.0018 is also chosen for this sample. The basis weight for the sample, due to the increase in weight attributable to the wear layer, is 4.7 pounds per square yard.

Figure 9:
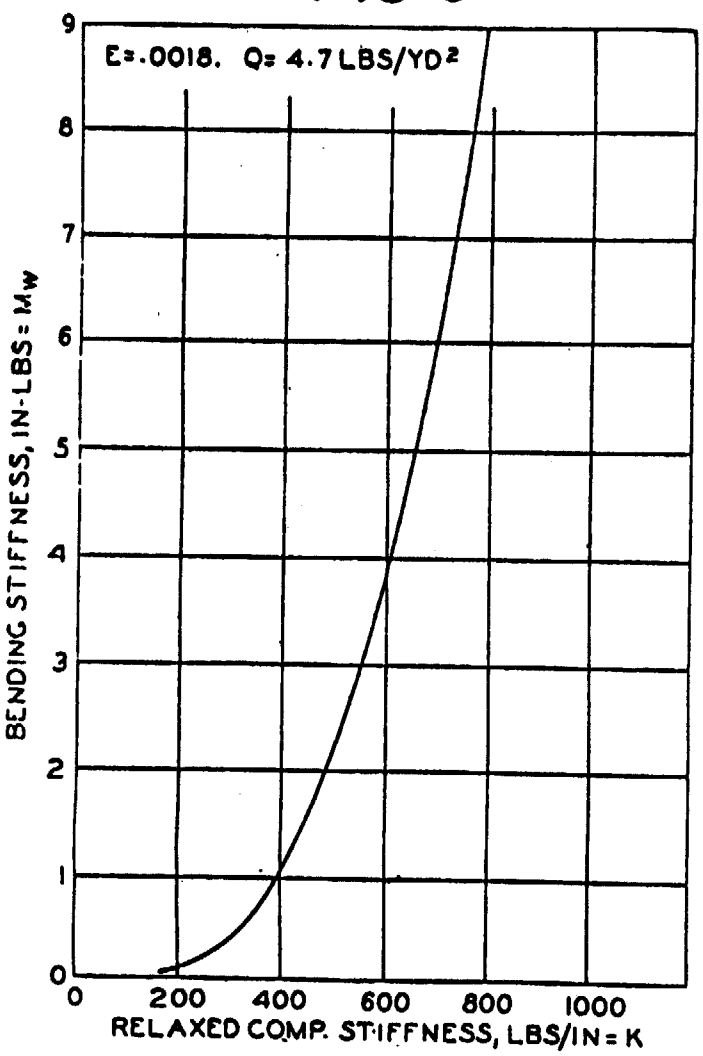
FIG. 9 illustrates the contour curve of Example 4.

The contour curve generated for these parameters as set forth in Example 1 is illustrated in FIG. 9. From this curve, it is seen that a range of relaxed compressive stiffness values of 160 to 790 is possible over a bending stiffness range of 0.1 to 9 inch-pounds. Using the relaxed tensile stiffness value of 227 for the reinforcing layer, 42 for the matrix material and a measured value of 10 for the 0.01-inch thick wear layer, the sum of the relaxed tensile stiffness values for the proposed structure is predicted to be 506 pounds per inch of width. A test structure is constructed essentially as set forth in Example 2, except that the wear layer is included. The 1,000-hour relaxed compressive stiffness value for this structure is 572 pounds per inch of width. The curve of FIG. 9 indicates that the bending stiffness value corresponding to this relaxed compressive stiffness value is 3.4 inch-pounds. This value is comparable to that obtained for the structure illustrated by FIG. 5; therefore, the structure of FIG. 8 is prepared in which reinforcing layer $R_1$ is disposed approximately 0.01 inch above surface $S_1$ and reinforcing layer $R_2$ is disposed 0.01 below surface $S_2$. The bending stiffness for this structure is shown to be 3.40 inch-pounds. When this structure is tested as described in Example 1, no buckling occurs, indicating that it is suitable for use over a subfloor having a subfloor dimensional change of 0.0015. Furthermore, the structural stability, measured as set forth in Example 2, is −0.06%, indicating that the structure is dimensionally stable.

Example 5

A sample identical to that prepared in Example 4 is constructed except that the side containing the wear layer is mechanically embossed to a depth of 0.005 inch. The relaxed compressive stiffness measured for this structure is 546 pounds per inch of width as compared to 572 pounds per inch of width for the unembossed structure. No buckling occurs when this structure is tested in the usual manner, thus indicating that it is also suitable for use over a subfloor having an expected subfloor dimensional change of 0.0015. The structural stability, determined as previously described, is −0.04%.

Example 6

This example illustrates the use of reinforcing materials having a dissolvable binder whereby the character of the reinforcing material changes in situ.

A flooring structure for use over a subfloor having a subfloor dimensional change of 0.002 is desired. Accordingly, a target critical buckle strain of 0.0026 is selected, as is a basis weight for the flooring structure of 6.0 pounds per square yard. Using these values for E and Q, respectively, and varying the relaxed compressive stiffness K between 0 and 10,000 ppiow and the bending stiffness $M_w$ between 0 and 9 inch-pounds, a countour curve is constructed as previously set forth. From the curve (not shown), the range of applicable relaxed compressive stiffness values is seen to be 135 to 600 ppiow. The matrix material used in Example 2, but containing in addition 34 parts by weight of butyl benzyl phthalate plastisizer, and having a relaxed tensile stiffness of 30 pounds per inch of width is selected for use with reinforcing material SAF 50/2 obtained from Manville Corporation. The reinforcing material has a measured relaxed tensile stiffness of 352 ppiow; thus, the expected relaxed compressive stiffness of a structure comprising two such reinforcing layers and the indicated matrix material should be 734 ppiow. It is known, however, that the reinforcing material will lose a portion of its stiffness contribution when placed in a vinyl matrix, apparently due to softening of the reinforcing material's binder in the presence of the plastisizer present in the plastisol.

A test structure comprising two layers of reinforcing material in the matrix material is constructed as follows: A layer of the plastisol described above, containing butyl benzyl phthalate to facilitate softening of the binder, is coated on a chrome steel plate at a thickness of 0.015 inch and one layer of SAF 50/2 reinforcing material is placed in the wet plastisol. When the reinforcement is saturated, the material is gelled at 400° F. for one minute and cooled. Thereafter, a layer of plastisol approximately 0.045 inch thick is placed on the gelled material and gelled by heating at 400° F. for 1.5 minutes. A third layer of plastisol 0.015 inch thick is applied to the gelled surface and a second layer of SAF 50/2 reinforcement is placed in the wet plastisol and allowed to saturate. The sample is then heated at 420° F. for 3.5 minutes to fuse the product. The resulting structure has a thickness of 0.130 inch and a measured basis weight of 6.0 pounds per square yard. The relaxed compressive stiffness value for this structure is measured to be 567 pounds per inch of width, which is significantly lower than the sum estimated above for this structure. From the curve, the bending stiffness corresponding to the relaxed compressive stiffness value of 567 pounds per inch of width is 7.5 inch-pounds. The measured bending stiffness for the structure is determined to be 7.47 inch-pounds.

The above values are within the expected range of values. Accordingly, a sample is subjected to a 1,000-hour summer-winter heating season test, as previously illustrated, in order to determine its suitability. No buckling is observed; therefore, the sample is suitable for use over a subfloor having a subfloor dimensional change of 0.002. The structural stability is determined to be +0.06%.

Example 7

This example illustrates that reinforcing material disposed within a flooring structure may be modified by external means such that the relaxed compressive stiffness of the reinforcing material and hence the relaxed compressive stiffness and the bending stiffness of the flooring structure are reduced.

Figure 10:
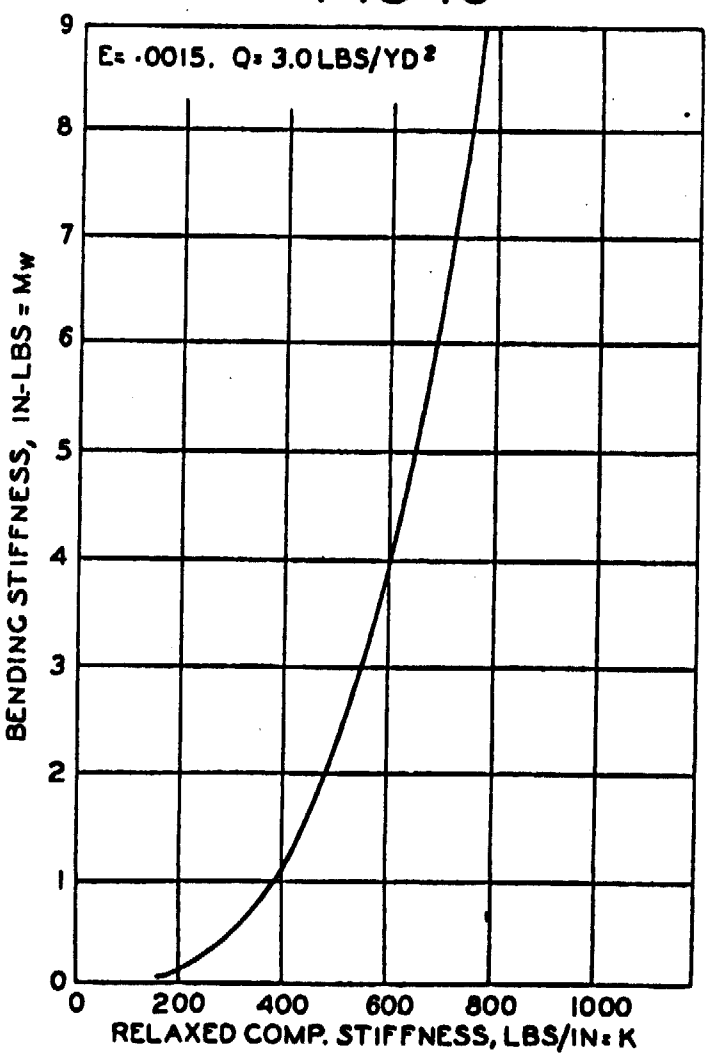
FIG. 10 illustrates the contour curve of Example 7.

A flooring structure is desired for use over a subfloor having a subfloor dimensional change of 0.001; therefore, a target critical buckle strain of 0.0015 is selected, as is a basis weight of 3.0 pounds per square yard. A contour curve is plotted in the usual manner and, from the curve (FIG. 10), the range of applicable relaxed compressive stiffness values is found to be 155 to 770 ppiow.

The following materials are selected to construct the flooring structure.

| Component | Relaxed Tensile Stiffness (ppiow) | Basis Weight (lbs/sq. yd.) |
|---|---|---|
| Manville Reinforcement | 512 | 0.04 |

-continued

| Component | Relaxed Tensile Stiffness (ppiow) | Basis Weight (lbs/sq. yd.) |
|---|---|---|
| SH-20/1 | | |
| Manville Reinforcement | 761 | 0.11 |
| SH-50/10 | | |
| PVC Plastisol | 30 | 2.85 |

Using these materials, a flooring structure is constructed with the heavier reinforcement near the backing. A coating of plastisol 0.015 inch thick is placed on a suitable release carrier and a layer of SH-50/10 reinforcement is placed in the plastisol and allowed to saturate. After saturation of this reinforcement, the material is gelled for one minute at 280° F. On the gelled substrate is placed a second coating of the same plastisol composition at a thickness of 0.032 inch. A layer of SH-20/1 reinforcement is placed on the top surface of the plastisol, allowed to saturate, and then fused at 425° F. to expand the structure to a final thickness of 0.115 inch. Upon cooling and separating the structure from the release carrier, a basis weight of 3.0 pounds per square yard is obtained. The structure demonstrates a relaxed compressive stiffness of 1303 pounds per inch of width and a bending stiffness of 5.50 inch-pounds. From the above cited range, it is obvious that the relaxed compressive stiffness of 1303 ppiow is too high, and that this structure will not exhibit the target critical buckle strain.

To reduce the relaxed compressive stiffness of this flooring structure, a sample is inverted and placed in a press such that the surface adjacent the SH-50/10 reinforcement is on top. Over this structure is placed a section of plastic material having a prismatic textured face with a pattern depth of approximately 0.05 inch. Pressure is applied to the flooring structure and the plastic such that the prismatic surface is pressed into the flooring structure to the depth of the prism pattern, thereby disrupting the character of the SH-50/10 reinforcing layer. The relaxed compressive stiffness of the modified sample of flooring structure is 547 pounds per inch of width and the bending stiffness is 3.21 inch-pounds. The critical buckle strain for this structure is seen to be 0.0015 from the curve, thus indicating that it is suitable for use over a subfloor having a subfloor dimensional change of 0.001. Furthermore, the structural stability is determined to be −0.06%, indicating that the structure is dimensionally stable.

Example 8

This example illustrates the construction of a flooring structure comprising a wear layer, a decorative layer, a foamed plastisol, and reinforcing materials.

Figure 11:
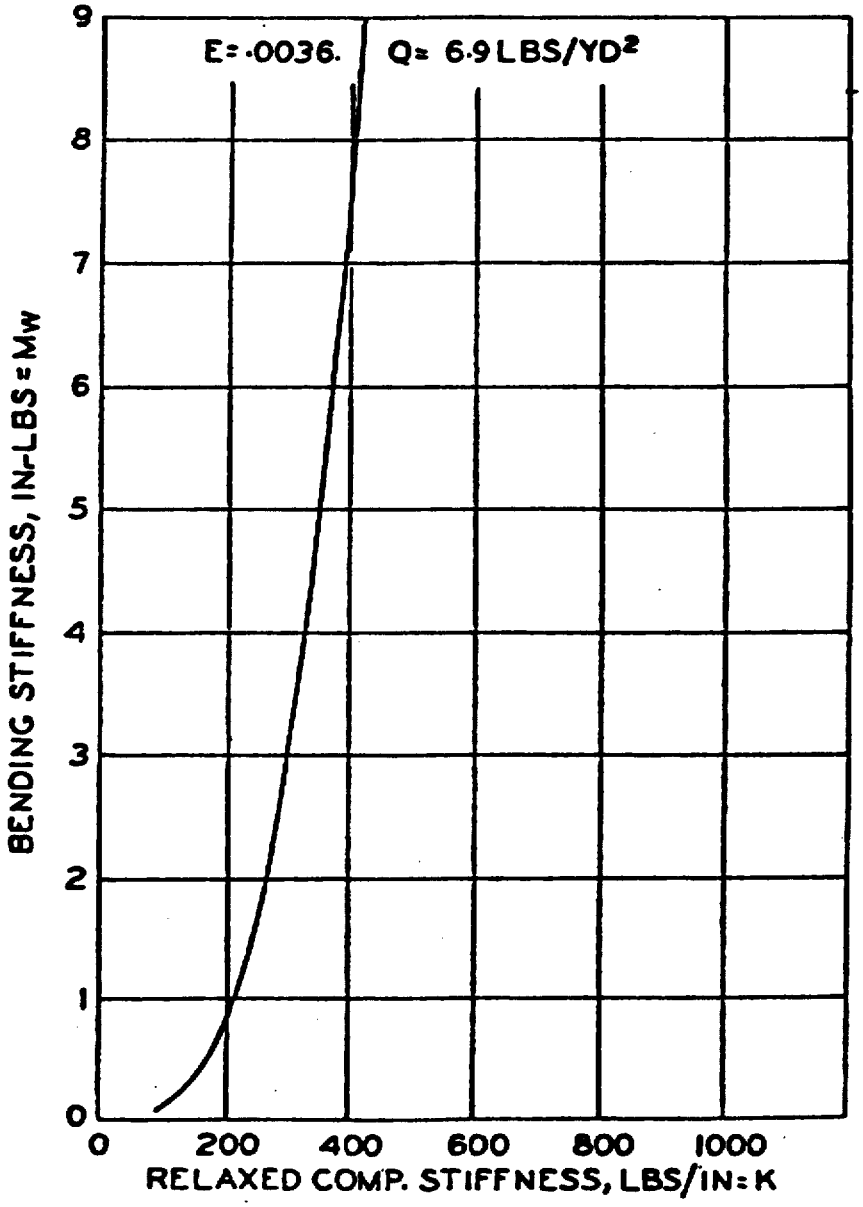
FIG. 11 illustrates the contour curve of Example 8.

A particleboard subflooring having a subfloor dimensional change of 0.0025 is selected for use. Therefore, a target critical buckle strain of 0.0036 is selected for the flooring structure, as is a basis weight of 6.9 pounds per square yard. A contour curve is constructed in the usual manner and, from the curve (FIG. 11), the applicable compressive stiffness range is seen to be 90 to 420 ppiow.

The following components are used to construct this flooring structure.

| Component | Relaxed Tensile Stiffness (ppiow) | Basis Weight (lbs/sq. yd.) | Component Thickness (inch) |
|---|---|---|---|
| PVC wear layer | 10 | 0.56 | 0.01 |
| Decorative layer | 36 | 3.27 | 0.052 |
| PVC foam layer | 35 | 3.00 | 0.10 |
| International Paper Reinforcement IP042081-2 | 227 | 0.03275 | 0.007 |

The foamable plastisol composition of Example 2 is coated on a release carrier at a thickness of 0.01 inch and the non-woven reinforcing layer from Example 1 is placed on the surface of the plastisol and allowed to saturate. The material is then gelled at 280° F. for one minute and cooled to room temperature. A second layer of plastisol 0.035 inch thick is applied to the surface of the gelled layer, heated at 425° F. to expand the foamable plastisol to a thickness of 0.10 inch and cooled to room temperature. The basis weight of this composite material is 3.0 pounds per square yard.

Onto the cool structure is placed a coating of a urethane adhesive composition 0.002 inch thick and the coating is then heated at 250° F. to evaporate the solvent. The urethane adhesive comprises 20% by weight urethane block copolymer, 80% by weight methyl ethyl ketone and 20% by weight silica gel thickener.

A decorative binder/chip layer is prepared by dicing a filled PVC composition into fine particles and mixing the resulting chips with a binder composition to form a particulate material suitable for deposition using a stencil. The chip composition is as follows:

| Component | Parts by Weight |
|---|---|
| Extrusion grade PVC homopolymer | 100 |
| Primary phthalate plasticizer | 32.5 |
| Epoxy-type plasticizer | 7.5 |
| Zinc stearate | 0.7 |
| Limestone filler | 328 |

The binder/chip composition is prepared by blending 1,225 parts by weight of the chip composition with 250 parts of solution-polymerized PVC resin, 123 parts primary plasticizer, 79.5 parts epoxy-type plasticizer and 4.5 parts of stabilizer. Mixing is accomplished using a Hobart Mixer with a wire whip attachment, the mixing time being approximately five minutes.

The previously prepared 0.10-inch thick foam sample on release carrier is perforated with a pin roll which punches holes through the entire structure at a spacing of approximately ⅛ inch. The decorative binder/chip composition is stenciled onto the perforated foam surface forming a layer of approximately 0.085 inch thick, the basis weight of this layer being 3.27 pounds per square yard. A second reinforcing layer identical to that used above is placed on the surface of the stenciled layer and the preformed PVC wear layer on a release carrier comprising an adhesive is placed on the chip layer such that the adhesive layer is in contact with the upper reinforcing layer. The entire structure is placed in a flat press with the upper platen heated to 295° F. and the lower platen being water cooled. The press is closed, exerting a mimimum pressure for eight seconds in order to consolidate the decorative stenciled layer from a thickness of 0.085 inch to a thickness of 0.052 inch. The press is then opened and an embossing plate preheated to 275° F. is inserted into the press. The press is closed for eight seconds, applying sufficient pressure to cause embossing of the structure to a depth of 0.016 inch. The composite sample is then removed from the press and cooled to room temperature, after which the top and bottom carrier layers are removed.

The relaxed compressive stiffness of this composite structure is measured to be 358 pounds per inch of width. For this measured value a bending stiffness of 5.5 is seen to be necessary by reference to the contour curve. The value measure for this structure is found to be 5.50 inch pounds; thus, no modification of the structure is required.

To evaluate the sample it is placed in an environmental test chamber for 1,000 hours where it is subjected to a summer-winter environmental change as described above. No buckling is observed; therefore, the test result indicates that the structure is suitable for use over a subfloor having a subfloor dimensional change of 0.0025.

Structures Comprising a Single Reinforcing Layer

The following examples illustrate modification techniques by which singly reinforced flooring structures may be modified in situ.

A foam structure comprising a single reinforcing layer and having a total thickness of 0.096 inch is prepared using the foamable plastisol described in Example 2. A layer of plastisol approximately 15 mils thick is applied to a release carrier and a non-woven glass fiber mat having a basis weight of 35 grams per square meter (Identification No. SH 35/6 from Manville Corporation) is embedded in the wet plastisol. The plastisol containing the embedded glass mat is then gelled at 280° F. for one minute. Upon cooling, a layer of plastisol 32 mils thick is placed on the gelled surface and the composite structure is fused at 430° F. for 2.5 minutes. The resulting structure has a basis weight of 2.8 pounds per square yard. The bending stiffness is measured to be 0.330 inch-pounds and the relaxed compressive stiffness is measured to be 1074 ppiow, both measurements being made as hereinbefore described.

Figure 15:
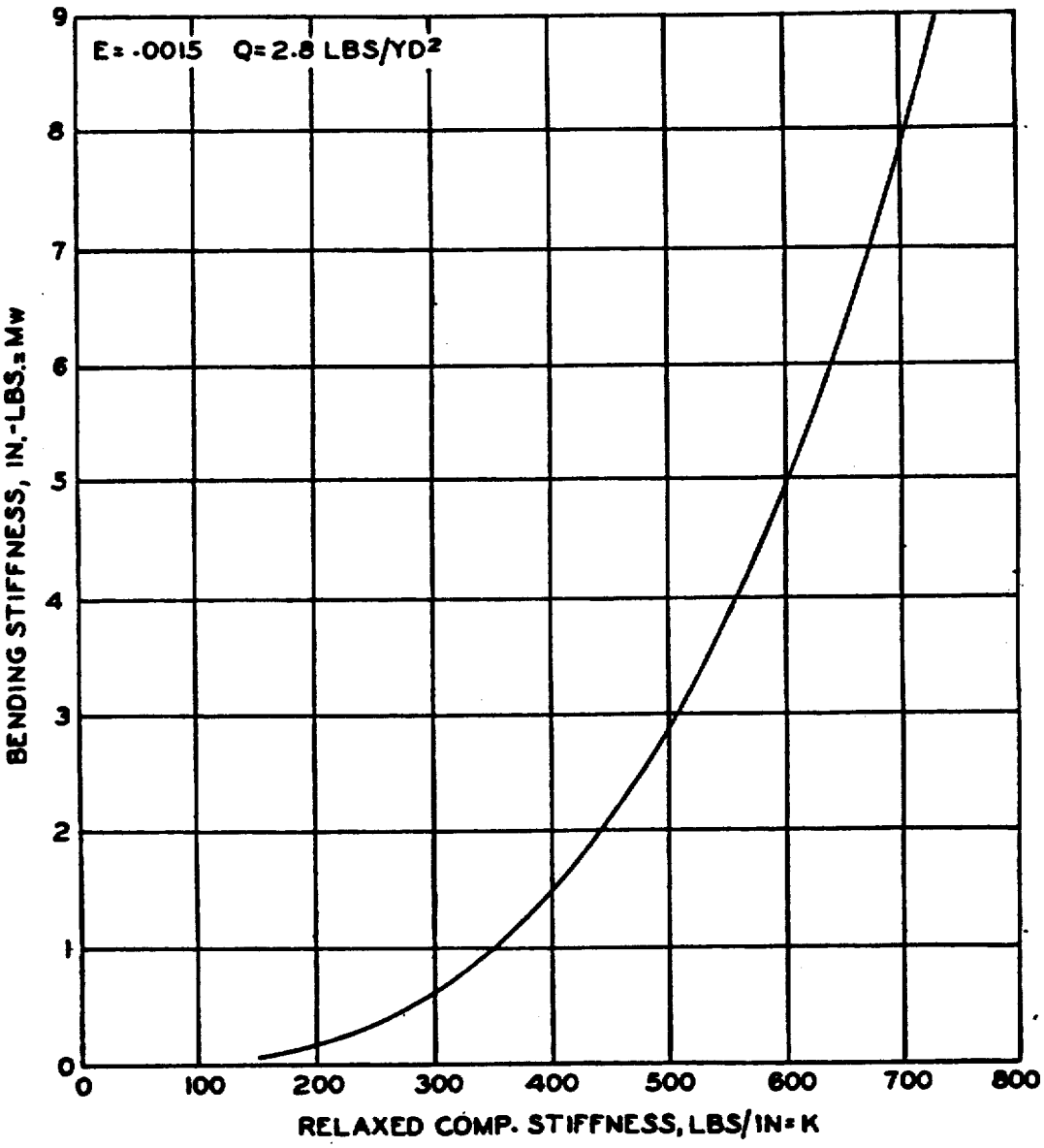
FIG. 15 illustrates the contour curve applicable to Examples 9–13.

To illustrate the applicability of this process, a curve is generated by arbitrarily selecting a subfloor dimensional change of 0.0013 and then selecting a target critical buckle strain of 0.0015. By assigning E the value 0.0015 and Q the value of 2.8 pounds per square yard, and then varying the bending stiffness, Mw, between 0 and 9 inch-pounds while varying the relaxed compressive stiffness, K, between 0 and 10,000 ppiow, a curve of constant critical buckle strain is generated (FIG. 15). From the curve, it is seen that for a structure having a bending stiffness of 0.330 inch-pounds, a relaxed compressive stiffness of 245 ppiow would be required. Thus, if the measured relaxed compressive stiffness values are greater than 245 ppiow, the modified structures would not meet the target critical buckle strains whereas, if the measured relaxed compressive stiffness values are equal to or less than this figure, acceptable critical buckle strain values would be obtained.

The utility of this approach may be seen from Examples 9–13 in which the above control sample is modified in various ways. A comparison of the modified ppiow values indicates whether the modification would be sufficient to give a product with a suitable critical buckle strain.

Example 9

This example illustrates a series of in situ modifications performed in a continuous pattern according to the design illustrated in FIG. 12. In all instances, the squares are cut in the indicated dimensions and the mortar line (the distance between the cut squares) is formed in the indicated dimension. The column entitled Square Area indicates the percentage of the total area which has been isolated from the continuum of reinforcing by cutting. The measured bending stiffness values and relaxed compressive stiffness values are indicated for each modification. The acceptability of each modification provide a suitable critical buckle strain is also indicated.

It is noted that regardless of the severity of the modification, the bending stiffness values tend to vary only slightly from the originally measured value. This is true in virtually all instances and indicates that the target relaxed compressive stiffness value which is originally estimated from the curve using the measured bending stiffness value will also remain essentially the same.

| Sample No. | Dimension of Square (inch) | Dimension of Mortar (inch) | Square Area % | Measured Relaxed Compressive Stiffness (Lbs/in of width) | Modification y = yes n = no | Bending Stiffness (In.-Lbs.) |
|---|---|---|---|---|---|---|
| A | 1/2 | 1/2 | 25 | 569 | n | .301 |
| B | | 3/4 | 45 | 401 | n | .303 |
| C | | 1/2 | 64 | 168 | y | .288 |
| D | | 1/16 | 81 | 117 | y | .272 |
| E | 3/4 | 3/4 | 27.5 | 579 | n | .324 |
| F | | 1/2 | 36 | 511 | n | .348 |
| G | | 3/4 | 56 | 295 | n | .329 |
| H | | 1/2 | 74 | 202 | y | .313 |
| I | 1 | 1 | 25 | 540 | n | .342 |
| J | | 3/4 | 36 | 545 | n | .343 |
| K | | 1/2 | 49 | 378 | n | .322 |
| L | | 3/4 | 64 | 312 | n | .327 |
| M | | 1/2 | 81 | 200 | y | .313 |

Example 10

This example illustrates a series of discontinuous pattern examples cut as illustrated in FIG. 14.

| Sample No. | Distance Separating Lines of Cutting (inch) | Measured Relaxed Compressive Stiffness (Lbs/in of width) | Acceptable Modification y = yes n = no | Bending Stiffness (In.-Lbs.) |
|---|---|---|---|---|
| A | 1/2 | 64 | y | .298 |
| B | 1/2 | 153 | y | .326 |
| C | 3/4 | 202 | y | .318 |

-continued

| Sample No. | Distance Separating Lines of Cutting (inch) | Measured Relaxed Compressive Stiffness (Lbs/in of width) | Acceptable Modification y = yes n = no | Bending Stiffness (In.-Lbs.) |
|---|---|---|---|---|
| D | 1 | 202 | y | .330 |

Example 11

This example illustrates the mechanical punching of a sample to internally disrupt the reinforcing layer. A wire grid consisting of wire having a diameter of 0.025 inch, the wires being disposed ½ inch apart, is pressed into the sample using a flat press and sufficient pressure to cause disruption of the reinforcing layer. Disruption is verified by taking a portion of the sample and dissolving the plastic material in tetrahydrofuran. Although the reinforcing layer is not completely separated into square elements, only a few fibers remain to connect the elements together. The relaxed compressive stiffness is 214 pounds per inch of width. These results indicate that the sample is not as significantly modified as a hand cut example (such as Example 10), but it is modified sufficiently to be acceptable.

Example 12

This example illustrates external mechanical modification using the prismatic surface described in Example 7. This surface is pressed into the sample to a depth of about 0.030" and a piece of the sample is dissolved in tetrahydrofuran to remove the polymeric material. Examination of the remaining glass fabric shows that it has been deformed or dented, but not cut, by the external modification. The relaxed compressive stiffness is found to be 524 ppiow which indicates that the sample will not have a suitable critical buckle strain. When compared to the unmodified control structure, a drop in the relaxed compressive stiffness of the sample of about 50% is noted. This illustrates how samples may be internally modified by compression without causing actual separation of the reinforcing layers. This observation has significance because it indicates that encapsulated glass structures may be physically modified in situ without adversely affecting the structural integrity of a product.

Example 13

This example illustrates a modified continuous pattern prepared according to the design illustrated in FIG. 13. The pattern is symmetrical and distances C—C, D—D and E—E are all ¼ inch. The relaxed compressive stiffness measured for this structure is 287 ppiow, indicating that its critical buckle strain has been dramatically improved, although it has not been improved enough for this structure to meet the target critical buckle strain of 0.0015. Nevertheless, this result is quite favorable, especially when compared to the results obtained for structures which have been modified by other means.

As an example, the isolated square area of this sample is 41%. The isolated square area of a sample cut according to example 9B is 45%, yet the relaxed compressive stiffness values are 401 ppiow for that sample and 287 ppiow for the present sample. Thus, in this instance, the modified continuous pattern is superior.

Structures Which are Adhered Using an Adhesive

Example 14

This example illustrates a process for adhering a surface covering to a subsurface wherein the esurface covering is unmodified and the adhesive is evaluated according to the present invention to ensure that it has adequate adhesive strength.

Four plastisol compositions were prepared having the formulations listed below. The molecular weights of the resins are determinable from the specific viscosities (in parentheses) which were measured according to ASTM D-1243.

| Ingredient | Parts by Weight |
|---|---|
| Plastisol A | |
| PVC homopolymer resin, dispersion grade (0.38) | 66 |
| PVC homopolymer resin, extender grade (0.35) | 34 |
| Monomeric plasticizer | 62 |
| Azobisdicarbonamide blowing agent | 0.8 |
| Blowing agent activator | 0.6 |
| Stabilizer | 0.7 |
| Limestone filler | 50 |
| Plastisol B | |
| PVC homopolymer resin, dispersion grade (0.38) | 66 |
| PVC homopolymer resin, extender grade (0.35) | 34 |
| Monomeric plasticizer | 62 |
| Azobisdicarbonamide blowing agent | 1.5 |
| Blowing agent activator | 0.6 |
| Stabilizer | 0.7 |
| Limestone filler | 50 |
| Plastisol C | |
| PVC homopolymer resin, dispersion grade (0.58) | 60 |
| PVC homopolymer resin, extender grade (0.35) | 40 |
| Monomeric plasticizer | 62 |
| Stabilizer | 1.5 |
| Pigment | 3 |
| Limestone filler | 50 |
| Plastisol D | |
| PVC homopolymer resin, dispersion grade (0.60) | 30 |
| PVC homopolymer resin, dispersion grade (0.42) | 70 |
| Monomeric plasticizer | 45 |
| Viscosity diluent | 5 |
| Stabilizer | 1 |

A surface covering was prepared as follows: A roll of #F7155 glass reinforcing material (mat), commercially available from Manville Corporation and having a basis weight of 55 grams per square meter, was used as a reinforcing layer. The glass reinforcing mat was passed through a knife coater where plastisol A was deposited so as to saturate the mat. The knife coater was adjusted to provide a gelled saturated glass layer having a thickness of 0.018 inch. The structure was passed around a heated drum with the plastisol-coated surface contacting the drum face. As a result of this procedure, which was conducted at a drum temperature of 285° F., the plastisol was gelled.

A layer of plastisol B 0.005 inch thick was applied to the smooth drum-finished surface by reverse roll coating and the coated mat was gelled by heating in an oven at 280° F. The structure was then fed through a rotogravure printer to deposit a decorative image on the surface of the gelled plastisol B.

After the decorative printing step, a clear layer of plastisol D was applied over the printed surface to provide a protective surface 0.01-inch thick. The coated structure was passed through a fusion oven preheated to 380° F. to: (1) fuse the plastisol layer D, (2) expand the gelled layer of foamable plastisol B to about three times its applied thickness, and (3) expand the gelled, saturated glass layer to about twice its gelled thickness. After exiting from the oven, the fused structure was mechanically embossed to create depressed areas of about 0.01 inch in depth into the decorated surface covering. The structure was then completed by applying about 0.008 inch of plastisol C to the back of the embossed surface covering and fusing the plastisol around a drum heated at 325° F. for approximately 15 to 20 seconds. Finally, the completed structure was cooled and fed to a windup device. The measured thicknesses of the various layers of the final structure were as follows:

| Layer | Thickness (inch) |
|---|---|
| wear surface - plastisol D | 0.0104 |
| foam formulation - plastisol B | 0.0188 |
| foam formulation - plastisol A | 0.0305 |
| back coat - plastisol formulation C | 0.0088 |
| Total thickness | 0.0685 |

The characteristics of this surface covering, measured as previously described, were as follows:

| | |
|---|---|
| relaxed compressive stiffness | 1274 ppiow |
| bending stiffness | 0.52 inch-pounds |
| basis weight | 2.7 pounds per sq. yd. |

Using these data, the critical buckle strain expected for this flooring was calculated to be 0.0005.

This material was intended for installation over a subsurface having a subsurface dimensional change of 0.003; accordingly, a target critical buckle strain of 0.0035 was selected for use in the calculation. For this purpose, the computer program previously used was modified to calculate the adhered basis weight, the general modification being illustrated in FIGS. 16A and 16B. In addition, the upper basis weight limit was extended to about 150 pounds per square yard from the value of 10 pounds per square yard previously used for calculating loose-lay flooring parameters. The measured values for the relaxed compressive stiffness and the bending stiffness, and the desired target critical buckle strain of 0.0035 were substituted into the equation and the adhered basis weight was calculated to be 145.4 pounds per square yard.

Because this material was intended for use as a floor covering, the actual basis weight of the material (2.7 pounds per square yard) would assist in holding the surface covering to the subsurface. Accordingly, the minimum adhesive force necessary to adhere the surface covering to the subsurface was calculated by subtracting 2.7 pounds per square yard from the calculated adhered basis weight of 145.4 pounds per square yard, giving a value of 142.7 pounds per square yard. It is noted that if the surface covering had been intended for use as a ceiling tile, the basis weight would have detracted from the adhesive strength and the minimum adhesive strength would have been obtained by adding the actual basis weight to the adhered basis weight.

Three adhesive candidates were selected for testing. Adhesives would normally be selected for long-term use in a given environment; therefore, in addition to strength, they would also be selected on the basis of their long-term compatibility with the particle board and with the fused PVC backcoat which were used to construct the surface covering/subsurface system. When considered on that basis, the three adhesive candidates normally would not have been selected because their long-term compatibility with these materials is unsatisfactory. However, because the purpose of this example was to illustrate the ability of the present invention to differentiate between adhesives on the basis of strength, and because the incompatibility problems were of little consequence during the term of the test, the incompatibility problems were disregarded.

The selected adhesives were Armstrong's commercial adhesives, S-750 and S-242, and an Armstrong experimental adhesive, referred to herein as EXP. The adhesive strength of each of these adhesives was measured in relation to the surface covering materials (the test vinyl backing and the test particle board) because no single adhesive strength value is applicable to an adhesive; i.e., the adhesive strength of an adhesive often varies depending on the materials with which it is used.

These adhesives were tested in the following manner. Commercial particle board sheets (4 ft. × 8 ft. × ⅛") were conditioned at 100° F. and 80% relative humidity (RH) for about two weeks until the length of the boards (measured daily) remained essentially unchanged for three days. Conditioning was then discontinued and the temperature and humidity were changed to essentially ambient conditions (72° F. and 50% RH). Pieces of the test surface covering 14 in. wide and 8 ft. in length were prepared, and duplicate samples for each adhesive were adhered to the particle board sheets. The ends of the test strips were stapled to the sheets so that the strips would be subjected to a representative compressive stress during the test. The length of each sheet ($L_s$) was measured at this time.

After the adhesive bond had aged under ambient conditions for one week, the conditions were adjusted to 20% RH and 70° F. The samples were then monitored as the particle board sheets dried out and contracted, thus placing a compressive force on the eight-foot span of the samples. When the surface covering samples buckled, indicating failure of the adhesive bond, the amount of sheet shrinkage for the particle board was measured by subtracting the sheet length at failure ($L_f$) from the sheet length at the time the samples were adhered to the sheets ($L_s$). The strain at failure was determined according to the equation $$\frac{L_s - L_f}{L_s} = \text{strain of failure}$$

For the purpose of this aspect of the invention, the strain at failure is referred to as the adhered critical buckle strain, which was defined earlier.

It was noted that all three adhesives failed differently during the test: The S-750 adhesive lost its cohesive strength and left adhesive residue on both surfaces; the S-242 adhesive remained on the particle board leaving the backing essentially free of adhesive residue; and the EXP adhesive remained on the surface of the backing and left essentially no residue on the particle board.

An average adhered critical buckle strain was determined for each system. By inserting this average value, and the relaxed compressive stiffness and bending stiffness values for the test surface covering (above), into the equation, the adhered basis weight for each system was calculated using the computer program illustrated in FIGS. 16A and 16B. Because the test surface was a floor covering, the actual basis weight was subtracted from each value to give the following adhesive strengths:

EXP = 13.0 lb./yd.$^2$
S-750 = 129.6 lb./yd.$^2$
S-242 = 180.5 lb./yd.$^2$

These values indicated that the S-750 and EXP adhesives would not perform satisfactorily because their adhesive strengths were less than the minimum strength as determined from the earlier calculation (142.7 pounds per square yard). The third adhesive, S-242, had an adhesive strength which was in excess of the calculated value, indicating that it would be suitable to adhere the test surface covering to the particle board subsurface.

To test the validity of this determination, particle board sheets were conditioned in an environmental test chamber at 80% RH and 72° F. for four weeks, after which a 12 ft.×10 ft. subsurface was built over a plywood support surface according to standard NPA installation directions. A 12 ft.×10 ft. piece of surface covering was then adhered to the subsurface using the S-242 adhesive. It is emphasized that the adhesive was applied exactly as it was for the above-described strip test, and exactly according to the application directions.

After the adhesive had aged, a six-week drying cycle was commenced to induce the particle board to shrink by its subsurface dimensional change factor of 0.003. Although certain minor deficiencies were noted during the test, these were not attributable to the present invention, and the installation was deemed to have performed satisfactorily. As an example of one deficiency, surface coverings of the type illustrated in this Example 14 are commonly affected by the presence of bubbles, or air pockets, between the surface covering and the subsurface. These pockets prevent adequate adhesion in certain small areas which eventually result in the presence of noticeable bubbles or blisters. These defects are attributable to the manner in which the test materials are installed and/or to a lack of initial adhesion, and are not attributable to the invention itself.

Example 15

This example will illustrate the situation where an adhesive is selected and a selected surface covering is modified so that it will be suitable for use with the adhesive when adhered to a given subsurface.

A surface covering was prepared essentially as described in Example 14, except that the glass mat was modified in situ after the embossing step, before the backing coat (plastisol C) was applied.

This surface covering was selected for use over a particle board subsurface having a subsurface dimensional change of 0.0015. The EXP adhesive was selected and the adhesive strength of this adhesive was determined as described in Example 14 to be 13.0 pounds per square yard.

The basis weight, bending stiffness and relaxed compressive stiffness were measured for the selected surface covering to give the following values:

| | |
|---|---|
| relaxed compressive stiffness | 1,274 ppiow |
| basis weight | 2.6 pounds per sq. yd. |
| bending stiffness | 0.63 inch pounds |

From these data, the unmodified surface covering was calculated to have a critical buckle strain of 0.0005. A target critical buckle strain of 0.002 was selected for use over the subsurface having an expected subsurface dimensional change of 0.0015.

The surface covering in this example was also intended for use as a floor covering. Accordingly, the adhered basis weight was calculated by adding the adhesive strength of 13.0 pounds per square yard for the adhesive and the actual basis weight (2.6 pounds per square yard) of the surface covering, giving a value of 15.6 pounds per square yard.

For this example, the computer program illustrated in FIGS. 1A and 1B was used to calculate the relaxed compressive stiffness, except that the upper limit for the basis weight was expanded such that it was in excess of the calculated adhered basis weight of 15.6 pounds per square yard. The measured bending stiffness, the adhered basis weight, and the target critical buckle strain were substituted into the equation to provide a calculated relaxed compressive stiffness value of 648 ppiow. Accordingly, modification of the surface covering was required in order to reduce the relaxed compressive stiffness from the initially measured value of 1,274 ppiow to a value less than or equal to 648 ppiow.

The surface covering was modified by cutting 1-inch diamond-shaped elements into the reinforcing layer from the back of the surface covering. The partial structure, was fed upside down at room temperature through a pair of pinch rolls, the upper roll being an embossing roll especially designed to perforate the glass reinforcement and the lower roll being a smooth steel back-up roll. The roll pressure was adjustable such that modification could be varied from slight modification at low pressure to substantial modification at higher pressure. For purposes of the present test, the nip pressure was adjusted to 120 pounds per lineal inch.

The upper embossing roll was designed with a pattern comparable to that shown in FIG. 12; however, the pattern was angled at 45 degrees to the machine direction to create a diamond-shaped element pattern. The raised portions of the embossing roll were 0.045 inch high and 0.025 inch wide.

After the material had passed through the nip, a test piece was placed in tetrahydrofuran solvent to dissolve the polymeric material and recover the modified glass mat. Visual inspection of the mat showed that the 1-inch diamond elements were almost completely separated from the continuum of glass, but a few strands still held the elements in place. The structure was completed as described in Example 14 through application of plastisol coat C. The relaxed compressive stiffness of the completed, modified structure was found to be 623 ppiow.

To evaluate the effect of this modification, the surface covering was installed over the selected particle board subsurface in the manner described in Example 14 and the adhered system was subjected to a six-week cycle during which the particle board shrank by about a factor of 0.0015, the expected subfloor dimensional change value. The installation performed satisfactorily and there was no evidence of buckling.

Example 16

This example will illustrate the modification of a surface covering, followed by selection of an appropriate adhesive which is compatible with the characteristics of the modified covering.

A surface covering was partially prepared, modified, and then completed as described in Example 15. The following physical properties were measured for the modified structure:

| | |
|---|---|
| relaxed compressive stiffness | 520 ppiow |
| bending stiffness | 0.58 inch-pounds |
| basis weight | 2.6 pounds per sq. yd. |

Using these data, a critical buckle strain of 0.001 was obtained for the in situ modified structure. A target critical buckle strain of 0.0035 was selected for use in the calculation based on a proposed particle board subfloor having a subfloor dimensional change of 0.003.

Figure 16A:
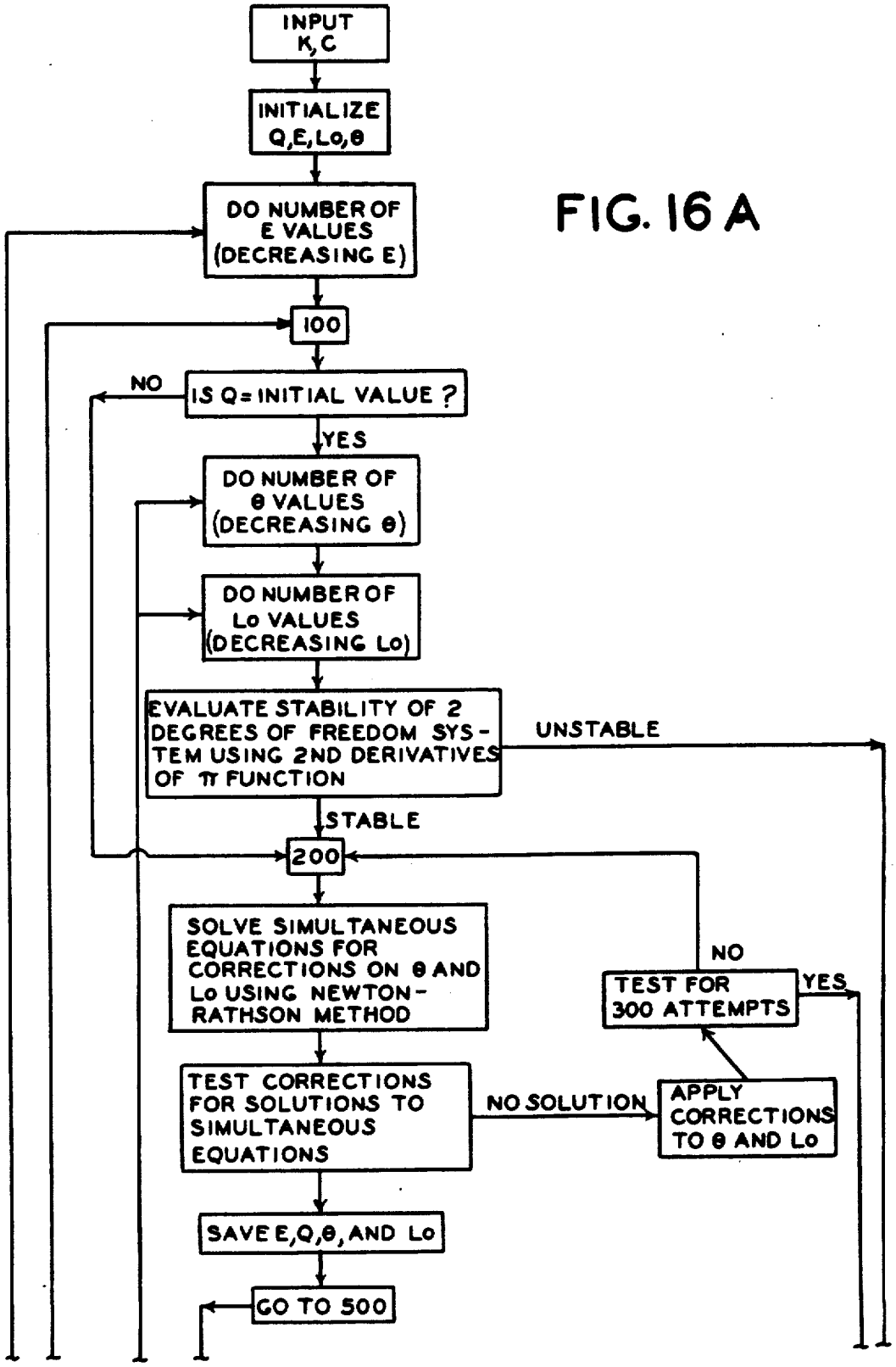
FIGS. 16A and 16B illustrate a diagram of a modified computer program, comparable to FIGS. 1A and 1B, which may be used to calculate the adhered basis weight and/or strain according to the present invention.
Figure 16B:
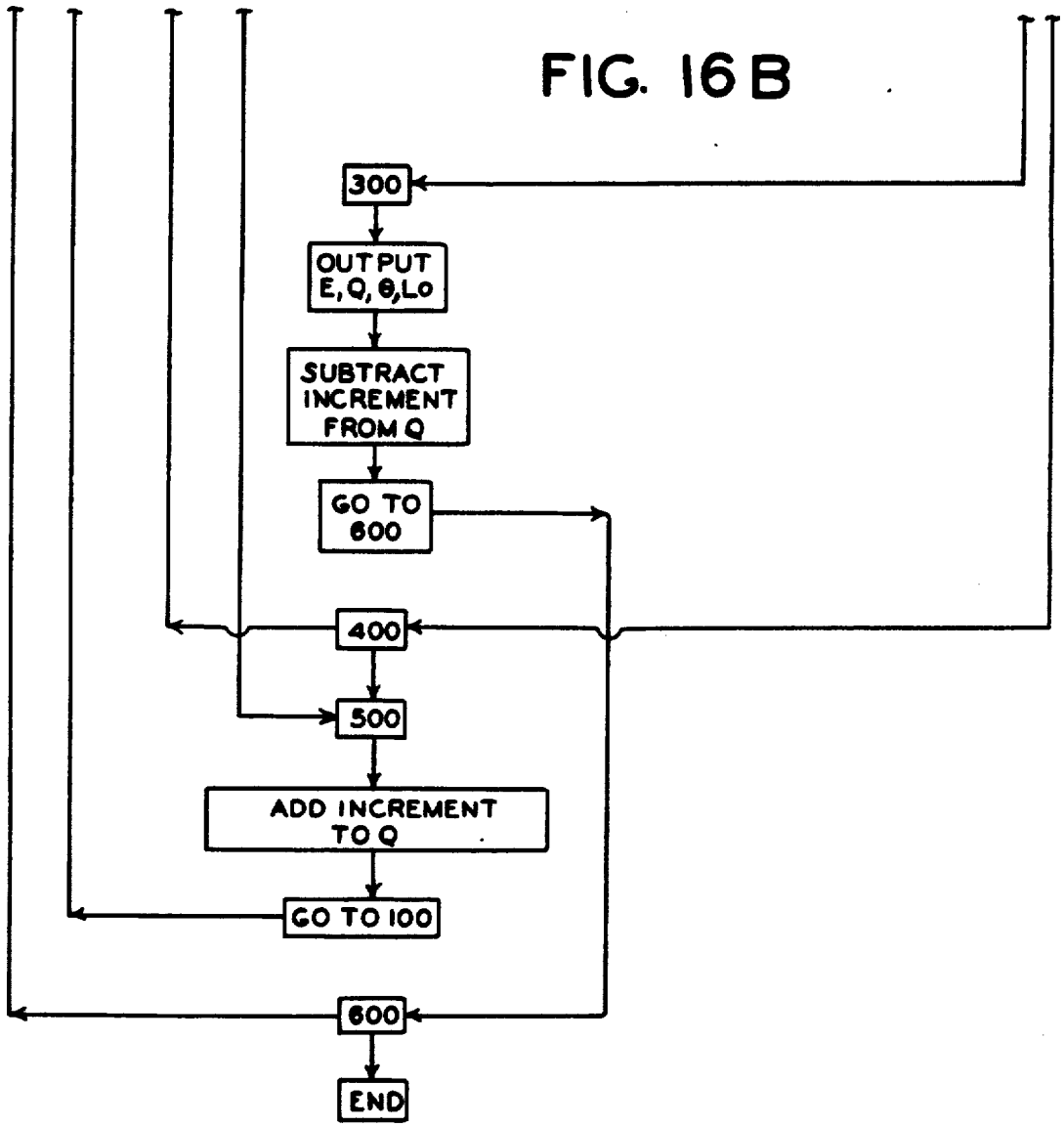

The modified computer program illustrated in FIGS. 16A and 16B was used to calculate the adhered basis weight by inserting the measured relaxed compressive stiffness and bending stiffness values, and the target critical buckle strain of 0.0035, into the equation. The adhered basis weight was calculated to be 35.8 pounds per square yard. This surface covering was also intended for use as a floor covering. Accordingly, the measured basis weight of 2.6 pounds per square yard was subtracted from the calculated adhered basis weight of 35.8 pounds per square yard in order to give a required minimum adhesive strength of 33.2 pounds per square yard for the adhesive.

The adhesive strengths for each of the three adhesives used in Example 14 were also applicable in this example because the materials which were being adhered together were identical. Accordingly, the above calculation indicates that two of the three adhesives (S-242 and S-750) would be suitable to adhere the modified structure in this example to the intended subsurface.

A 10 ft.×12 ft. surface covering sample was adhered to a particle board subsurface using the S-750 adhesive and tested as described above for six weeks under simulated environmental test conditions which would induce a subfloor dimensional change of 0.003. Satisfactory performance was found and there was no indication of buckling.

Examples Illustrating Increases and Reductions of Relaxed Compressive/Tensile Stiffness Values

Example 17

This example will illustrate a physical modification of a reinforcing layer such that the relaxed tensile stiffness of the layer was increased. A 15-inch wide roll of polyester non-woven mat from International Paper Co. (Experimental No. 031781-2) having a basis weight of 0.5 ounce per square yard was selected for use. In this and subsequent examples, the following procedure was used to measure the relaxed tensile stiffness.

Specimens were cut in 2-inch×12-inch dimensions, the 12-inch dimension being in the machine direction of the non-woven mat. Each specimen was placed in the jaws of an Instron Tensile Tester such that the distance between the jaws was 8 inches. A tensile force was then placed on the sample to elongate it by 0.3%. The initial (peak) force was recorded and a curve of force decay was plotted for 90 minutes, after which the decay curves were mathematically extrapolated to 1,000 hours. The 1,000-hour values (in ppiow) were divided by the induced strain of 0.003 to provide the relaxed tensile stiffness. Control values were obtained by measuring the relaxed tensile stiffness of an untreated mat (17a), and also of the mat after heating in an oven at 380° F. for 1.5 minutes (the conditions which were used to heat-cure the treated sample). The latter sample was designated 17b.

Figure 17:
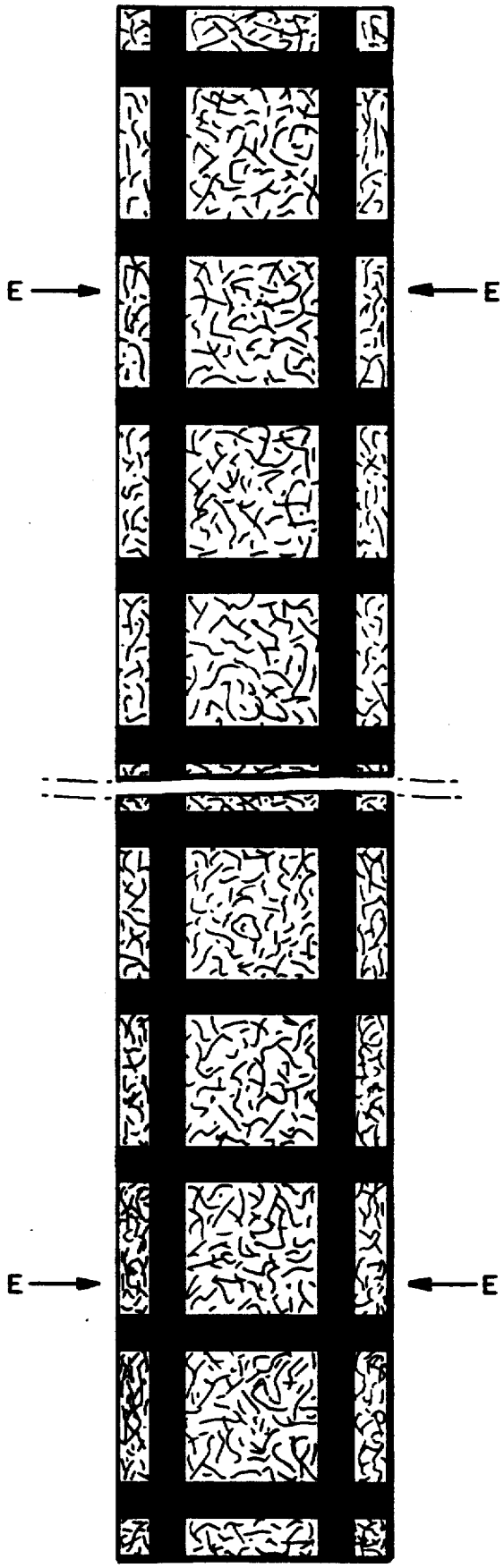
FIG. 17 illustrates a test strip having differential regions of relaxed compressive/tensile stiffness.

The treated sample (17c) was prepared by applying a pattern of plastisol to the mat at a level of about 125 grams per square yard, permitting the sample to stand for one hour, and then fusing the plastisol as indicated above. The plastisol used was Plastisol D of Example 14, and the pattern of application was essentially as illustrated in FIG. 12 where the squares are 1 inch on edge and the mortar lines, as indicated by lines A—A and B—B, are ¼-inch wide. Lines A—A were oriented in the machine direction whereas lines B—B were oriented in an across machine direction. FIG. 17 illustrates the appearance of the treated sample wherein arrows E—E indicate the lines along which the Instron jaws were fastened.

The following data were obtained for these samples:

| Example | Description | Initial (Peak) Force at 0.3% Elongation (ppiow) | Extrapolated Relaxation (ppiow) | Relaxed Tensile Stiffness (ppiow) |
|---|---|---|---|---|
| 17a | Control | 0.423 | 0.327 | 109 |
| 17b | Heated Control | 0.177 | 0.082 | 27.3 |
| 17c | Treated Sample | 0.782 | 0.275 | 91.7 |

These results indicate that the treated sample had a relaxed tensile stiffness which was increased relative to the heated control, but which was lower than the value obtained for the unheated control. The latter value is a relatively meaningless number, however, because, under conventional processing conditions used for the selected plastisol, the untreated mat would be altered by heating and would therefore have the performance characteristics of the heated control.

Example 18

This example will illustrate a process where the relaxed tensile stiffness of a mat is first increased, and then decreased. A layer of Plastisol D from Example 14 was coated at a thickness of ca 0.01 inch onto a release surface and a sheet of the polyester mat of Example 17 was placed in the plastisol and allowed to saturate for 5 minutes. The saturated mat was then heated as described in Example 17, cooled and the release paper was removed. The approximate level of application of fused Plastisol D was about 286 grams per square yard. A sample (18a) was then prepared for testing as described in Example 17.

A second sample was prepared in the same manner except that the level of application was about 305 grams per square yard. The pattern of Example 17 was drawn by pencil on the surface of the fused mat, and the 1-inch squares were cut from the mat. A sample (18b) was prepared for testing. The measured results for the two samples are as follows, and they indicate that the relaxed tensile stiffness of the control mat was first increased, and then decreased.

| Example | Description | Initial (Peak) Force at 0.3% Elongation (ppiow) | Extrapolated Relaxation (ppiow) | Relaxed Tensile Stiffness (ppiow) |
|---|---|---|---|---|
| 17b | Heated Control | 0.177 | 0.082 | 27.3 |
| 18a | Fused Mat | 0.914 | 0.456 | 152 |
| 18b | Fused, | 0.193 | 0.121 | 40.3 |

-continued

| Example | Description | Initial (Peak) Force at 0.3% Elongation (ppiow) | Extrapolated Relaxation (ppiow) | Relaxed Tensile Stiffness (ppiow) |
|---|---|---|---|---|
| | Modified Mat | | | |

Example 19

This example will illustrate the preparation of a sample having an increased relaxed tensile stiffness value through the use of a cross-linkable plastisol saturant comprising 300 parts by weight of Plastisol D, 60 parts by weight of trimethylolpropane trimethacrylate, and 4 parts by weight of tertiary-butyl perbenzoate activator. A polyester mat as described in Example 17 was placed in the plastisol and allowed to saturate using the procedure described in Example 18. After the 5-minute saturation time had elapsed, the sample was placed in an oven at a temperature of 275° F. for 5 minutes. This heating exposure gelled the plastisol, but did not decompose the activator. After gelling was complete, the sample was removed from the oven and cooled.

The pattern of Example 17 was drawn onto the surface of the gelled mat and an inhibitor composition comprising 88 parts by weight of solvent (70% nitroethane, 25% isopropyl acetate and 5% diacetone alcohol), 5 parts by weight of isopropyl alcohol and 12 parts by weight of hydroquinone was painted onto the 1-inch square regions of the pattern using a paint brush. The painted sample was allowed to air-dry for two hours and was then placed in a 380° F. oven for 1.5 minutes to fuse and cross-link the structure. After cooling to room temperature, the sample was separated from the carrier and visually evaluated. The inhibitor-treated regions were observed to be off-white in color whereas the mortar lines appeared brown. The total weight of the applied materials was approximately 232 grams per square yard.

A test sample (19) was cut from the above material and examined in the usual manner to give the following results:

| Example | Description | Initial (Peak) Force at 0.3% Elongation (ppiow) | Extrapolated Relaxation (ppiow) | Relaxed Tensile Stiffness (ppiow) |
|---|---|---|---|---|
| 17b | Heated Control | 0.177 | 0.082 | 27.3 |
| 19 | Cross-Linked Sample | 1.000 | 0.398 | 133 |

Example 20

This example will illustrate the preparation of a structure which was usable as a loose-lay area installation; i.e., its structural stability was such that it should not have been loose-laid in areas along walls or doors where shrinkage would be unsightly.

A non-woven glass fiber mat, designated SH35/6 from Glaswerk Schuller GmbH, was selected for use. Onto the surface of this mat was drawn a pattern similar to that illustrated in FIG. 12 wherein the squares were 0.8-inch on edge and the mortar lines, as indicated by lines A—A and B—B of FIG. 12, were approximately 0.33-inch in width. Lines A—A were oriented in the machine direction whereas lines B—B were oriented in an across machine direction. After drawing the pattern, the square regions were physically cut from the sheet and removed.

The area structure was prepared by placing a 0.02-inch thick coating of a foamable plastisol (Plastisol B from Example 14) on a release paper using a knife applicator. The plastisol was then gelled for 2 minutes in an oven at 275° F. After cooling to room temperature, a second coating of Plastisol B was applied at a level of 0.01-inch over the first coating and the pre-modified reinforcing layer was placed in the wet plastisol and allowed to saturate for several minutes. The composite material was then gelled by placing the sample in an oven at 275° F. for 2 minutes. After cooling to room temperature, a third coating of Platisol B was applied as a top layer at a thickness of about 0.02-inch and gelled by placing the structure in an oven at 275° F. for about 5 minutes. The resulting structure had a thickness of approximately 0.05-inch.

A coating of Plastisol D was applied to the cooled surface of the gelled substrate at a level of 0.01-inch and the sample was placed in a fusion oven for about 2.5 minutes at 390° F., after which the oven was opened and the sample was turned 180 degrees. Heating was then continued for an additional 2 minutes. After cooling to room temperature, the sample was separated from the release carrier and its physical parameters were measured. The thickness of the sheet was found to be about 0.14 inches, the basis weight was measured to be 3.4 pounds per square yard and the relaxed compressive/tensile stiffness was found to be 57 ppiow. The bending stiffness of the sample was determined to be 0.26 inch-pounds and the critical buckle strain was calculated to be 0.0034. Upon subjecting the sample to a structural stability test as earlier described, a shrinkage of 0.165 inch or 1.38 percent was observed. This structure was suitable for use as an area cover.

Our invention is not restricted solely to the descriptions and illustrations provided above, but encompasses all modifications envisaged by the following claims.

We claim:

1. A process for providing a resilient loose-lay floor structure, said process comprising the steps of selecting a target critical buckle strain for said floor structure, said critical buckle strain being greater than the subfloor dimensional change of a target subfloor, selecting an approximate basis weight for said floor structure, said basis weight being within the range of from about 2 to about 10 pounds per square yard, plotting a contour curve of the selected critical buckle strain for said selected basis weight by varying the bending stiffness values from about 0 to about 9 inch-pounds and by varying the relaxed compressive stiffness values from about 0 to about 10,000 pounds per inch of width, determining from said contour curve the range defined by the minimum and maximum relaxed compressive stiffness values corresponding to bending stiffness values of about 0.1 and about 9 inch-pounds, respectively, selecting a matrix material and at least two layers of reinforcing material such that the sum of the relaxed compressive stiffness values for said materials falls within the determined range, said matrix material and said reinforcing materials being selected such that the sum of the relaxed compressive stiffness values for said reinforcing materials is not less than the sum of the relaxed compressive stiffness values for said matrix material, determining from said contour curve the bending stiffness value applicable to the sum of the relaxed compressive stiffness values for said reinforcing materials and said matrix material, and disposing said layers of reinforcing material in said matrix material such that the measured bending stiffness of the resultant floor structure corresponds to the determined bending stiffness, at least one reinforcing layer being approximately above the neutral bending plane of said resultant floor structure and at least one reinforcing layer being approximately below said neutral bending plane, whereby the critical buckle strain of said resultant floor structure is approximately equivalent to the target critical buckle strain and is greater than the strain expected to be caused by said subfloor dimensional change.

2. The invention as set forth in claim 1 hereof wherein said minimum relaxed compressive stiffness value determined from said contour curve corresponds to a minimum bending stiffness value of 1 inch-pound, said floor structure being intended for use over a subfloor having a subfloor dimensional change of not less than 0.0015.

3. The invention as set forth in claim 2 hereof wherein said minimum bending stiffness value is 3 inch-pounds and said subfloor dimensional change is not less than 0.0030.

4. The invention as set forth in claims 1, 2 or 3 hereof wherein the bending stiffness value required for said floor structure is determined by constructing a test floor structure comprising said matrix material and said reinforcing materials, measuring the relaxed compressive stiffness thereof, and determining from said curve the bending stiffness which corresponds to said measured relaxed compressive stiffness, said test structure having a basis weight essentially equivalent to the selected basis weight.

5. The invention as set forth in claim 4 hereof wherein the ratio of the sums of said relaxed compressive stiffness values for said reinforcing materials and said matrix material is at least 5 to 1.

6. The invention as set forth in claim 5 hereof wherein said ratio is at least 10 to 1.

7. A process for making a resilient loose-lay floor structure, said process comprising the steps of selecting a subfloor dimensional change value corresponding to a target subfloor, selecting a matrix material and at least one reinforcing material, said matrix material and said reinforcing material being selected such that the sum of the relaxed compressive stiffness values for all reinforcing materials used in said structure is not less than the relaxed compressive stiffness value for said matrix material, and the basis weight of said floor structure is from about 2 to about 10 pounds per square yard, constructing a test structure by disposing at least two layers of reinforcing material within said matrix material such that the bending stiffness of said test structure is from about 0.1 to about 9 inch-pounds, at least one layer of reinforcing material being approximately above the neutral bending plane of said test structure and at least one layer of reinforcing material being approximately below said neutral bending plane, modifying the relaxed compressive stiffness value of at least one of said reinforcing layers as necessary to provide a critical buckle strain for said test structure which is greater than said subfloor dimensional change value, and constructing said loose-lay floor structure corresponding to said test structure, whereby the critical buckle strain of said loose-lay floor structure is greater than the strain expected to be caused by said subfloor dimensional change.

8. The invention as set forth in claim 7 hereof wherein said bending stiffness is from about 1 to about 9 inch-pounds, said subfloor having a subfloor dimensional change of not less than 0.0015.

9. The invention as set forth in claim 8 hereof wherein said bending stiffness is from about 3 to about 9 inch-pounds and said subfloor dimensional change is not less than 0.0030.

10. The invention as set forth in claim 7 hereof wherein the ratio of the sums of said relaxed compressive stiffness values for said reinforcing materials and said matrix material is at least 5:1.

11. The invention as set forth in claim 10 hereof wherein said ratio is at least 10:1.

12. The invention as set forth in claim 8 hereof wherein the ratio of the sum of said relaxed compressive stiffness values for said reinforcing materials and said matrix material is at least 5:1.

13. The invention as set forth in claim 12 hereof wherein said ratio is at least 10:1.

14. The invention as set forth in claim 9 hereof wherein the ratio of the sums of said relaxed compressive stiffness values for said reinforcing materials and said matrix material is at least 5:1.

15. The invention as set forth in claim 14 hereof wherein said ratio is at least 10:1.

16. The invention as set forth in claims 7, 8, 9, 10, 11, 12, 13, 14, or 15 hereof wherein said layers of reinforcing material have the same composition.

17. The invention as set forth in claims 7, 8, 9, 10, 11, 12, 13, 14, or 15, hereof wherein said layers of reinforcing material have different compositions.

18. The invention as set forth in claims 7, 8, 9, 10, 11, 12, 13, 14 or 15 hereof wherein each of said layers of reinforcing material is disposed within said matrix material in a substantially planar fashion.

19. The invention as set forth in claims 7, 8, 9, 10, 11, 12, 13, 14 or 15 hereof wherein a substantial portion of at least one of said reinforcing layers does not lie in the plane thereof.

20. The invention as set forth in claims 7, 8, 9, 10, 11, 12, 13, 14 or 15 hereof wherein the relaxed compressive stiffness of at least one of said reinforcing layers has been modified.

21. The invention as set forth in claim 20 hereof wherein said modification has been accomplished in situ.

22. A process for providing a resilient loose-lay floor structure, said process comprising the steps of selecting a floor structure having a basis weight of from about 2 to about 10 pounds per square yard and having at least two layers of reinforcing material disposed within a matrix material, at least one layer of reinforcing material being approximately above the neutral bending plane of said floor structure and at least one layer of reinforcing material being approximately below aaid neutral bending plane, said structure being unsuitable for use as a loose-lay floor structure over subfloors having a target subfloor dimensional change because it has a bending stiffness which is in excess of about 9 inch-pounds, or a critical buckle strain which is not greater than said subfloor dimensional change value, or both, and modifying at least one of said reinforcing layers by external means such that the bending stiffness of the resultant flooring structure is within the range of from about 0.1 to about 9 inch-pounds and the critical buckle strain of said resultant flooring structure is greater than said subfloor dimensional change.

23. The invention as set forth in claim 22 hereof wherein the bending stiffness of said resultant flooring structure is within the range of from about 1 to about 9 inch-pounds, said ascertained subfloor dimensional change being not less than 0.0015.

24. The invention as set forth in claim 23 hereof wherein said bending stiffness is from about 3 to about 9 inch-pounds and said ascertained subfloor dimensional change is not less than 0.0030.

25. The invention as set forth in claims 22, [38 or 39] *23 or 24* hereof wherein said layers of reinforcing material have the same composition.

26. The invention as set forth in claims 22, [38 or 39] *23 or 24* hereof wherein said layers of reinforcing material have different compositions.

27. The invention as set forth in claims 22, [38, or 39] *23 or 24* hereof wherein each of said layers of reinforcing material is disposed within said matrix material in a substantially planar fashion.

28. The invention as set forth in claims 22, [38 or 39] *23 or 24* hereof wherein a substantial portion of at least one of said reinforcing layers does not lie in the plane thereof.

29. A process for preparing a flooring structure comprising a single reinforcing layer, said process comprising the steps of selecting a flooring structure comprising a single reinforcing layer, the critical buckle strain of said structure being less than the subfloor dimensional change of a target subfloor, and modifying said flooring structure in situ such that the critical buckle strain becomes greater than said subfloor dimensional change, whereby said structure will be suitable to accommodate the subfloor movement of a subfloor having said target subfloor dimensional change.

30. The invention as set forth in claim 29 hereof comprising the additional steps of selecting a target critical buckle strain, said critical buckle strain being greater than said subfloor dimensional change;

measuring the relaxed compressive stiffness, the bending stiffness and the basis weight of said selected flooring structure;

plotting a contour curve of the target critical buckle strain for said selected flooring structure by varying the bending stiffness values from about 0 to about 9 inch-pounds and by varying the relaxed compressive stiffness values from about 0 to about 10,000 pounds per inch of width;

determining from said contour curve the target relaxed compressive stiffness which will be required for said modified flooring structure; and modifying said selected flooring structure in situ such that the resulting modified flooring structure has a relaxed compressive stiffness value which is the same as or less than the target relaxed compressive stiffness.

31. The invention as set forth in claim 30 hereof wherein said reinforcing layer is a glass reinforcing layer.

32. The invention as set forth in claims 29, [45 or 46] *30 or 31* hereof wherein said reinforcing layer has a basis weight of from about 15 to about 160 grams per square meter.

33. The invention as set forth in claim 32 hereof wherein said basis weight is from about 20 to about 80 grams per square meter.

34. The invention as set forth in claims 29, [45 or 46] *30 or 31* hereof wherein said modification is achieved using a continuous modification pattern.

35. The invention as set forth in claims 29, [45 or 46] *30 or 31* hereof wherein said modification is achieved using a modified continuous pattern.

36. The invention as set forth in claims 29, 45 or 46 hereof wherein said modification is achieved using a discontinuous modification pattern.

37. The invention as set forth in claims 29, 45 or 46 hereof wherein said modification is achieved using a discontinuous modification pattern in combination with a continuous or a modified continuous pattern.

38. The invention as set forth in claims 29, 45 or 46 hereof wherein said structure has a structural stability of not more than about 0.5%.

39. A process for adhering a surface covering to a subsurface, said process comprising the steps of (a) selecting a surface covering, the critical buckle strain of said covering being less than the subsurface dimensional change of a target subsurface;

(b) selecting a target critical buckle strain which is greater than the subsurface dimensional change;

(c) measuring the relaxed compressive stiffness, the bending stiffness and the basis weight of said selected covering;

(d) calculating the adhered basis weight for a surface covering having the measured bending stiffness, the measured relaxed compressive stiffness, and a critical buckle strain that is equal to the target critical buckle strain;

(e) calculating the minimum adhesive strength which will be necessary to adhere said surface covering to said subsurface in a manner which will prevent buckling;

(f) selecting a suitable adhesive, and (g) adhering said surface covering to said subsurface, whereby said surface covering will accommodate the subsurface movement of said subsurface without buckling.

40. The invention as set forth in claim 39 hereof wherein said surface covering comprises at least one reinforcing layer.

41. The invention as set forth in claim 40 hereof wherein said reinforcing layer is a glass reinforcing layer.

42. The invention as set forth in claims 40 or 41 hereof wherein each said reinforcing layer has a basis weight of from about 15 to about 160 grams per square meter.

43. The invention as set forth in claim 42 hereof wherein said basis weight is from about 20 to about 80 grams per square meter.

44. A process for modifying a surface covering comprising at least one reinforcing layer, said process comprising the steps of (a) selecting a surface covering comprising at least one reinforcing layer, the critical buckle strain of said selected covering being less than the subsurface dimensional change of a target subsurface;

(b) selecting an adhesive having a determined adhesive strength;

(c) measuring the basis weight, the bending stiffness and the relaxed compressive stiffness of said selected covering;

(d) selecting a target critical buckle strain which is greater than said subfloor dimensional change;

(e) calculating the adhered basis weight which would be obtained if said selected covering were adhered to said subsurface using said adhesive;

(f) calculating the relaxed compressive stiffness for a modified surface covering having the measured bending stiffness, the calculated adhered basis weight, and a critical buckle strain which is equal to the target critical buckle strain, and (g) modifying said covering in situ such that it has a relaxed compressive stiffness value which is not greater than the calculated relaxed compressive stiffness value, whereby said modified structure is capable of being adhered to said subsurface using said adhesive such that it will accommodate the subsurface novement of said subsurface without buckling.

45. The invention as set forth in claim 44 hereof wherein said reinforcing layer is a glass reinforcing layer.

46. The invention as set forth in claim 44 or 45 hereof wherein said reinforcing layer has a basis weight of from about 15 to about 160 grams per square meter.

47. The invention as set forth in claim 46 hereof wherein said basis weight is from about 20 to about 80 grams per square meter.

48. The invention as set forth in claims 44 or 45 hereof wherein said modification is achieved using a continuous modification pattern.

49. The invention as set forth in claims 44 or 45 hereof wherein said modification is achieved using a modified continuous pattern.

50. The invention as set forth in claims 44 or 45 hereof wherein said modification is achieved using a discontinuous modification pattern.

51. The invention as set forth in claims 44 or 45 hereof wherein said modification is achieved using a discontinuous modification pattern in combination with a continuous or a modified continuous pattern.

52. The invention as set forth in claims 44 or 45 hereof wherein said structure has a structural stability of not more than about 0.5%.

53. A process for modifying a surface covering comprising at least one reinforcing layer, said process comprising the steps of (a) selecting a surface covering comprising at least one reinforcing layer, the critical buckle strain of said selected covering being less than the subsurface dimensional change of a target subsurface;

(b) modifying said covering in situ such that the critical buckle strain of the modified covering is greater than the initially measured critical buckle strain, but less than the critical buckle strain which would equal or exceed the subsurface dimensional change;

(c) selecting a target critical buckle strain which is greater than the subsurface dimensional change;

(d) measuring the bending stiffness, relaxed compressive stiffness and basis weight of said modified covering;

(e) calculating the adhered basis weight for a covering having the measured bending stiffness, the measured relaxed compressive stiffness, and a critical buckle strain that is equal to the target critical buckle strain; and (f) calculating the minimum adhesive strength necessary to adhere said modified covering to said target subsurface, whereby when said modified covering is adhered to said target subsurface using a suitable adhesive having an adhesive strength at least as great as said calculated adhesive strength, said modified covering will be suitable to accommodate the subsurface movement of said target subsurface without buckling.

54. The invention as set forth in claim 53 hereof wherein said reinforcing layer is a glass reinforcing layer.

55. The invention as set forth in claims 53 or 54 hereof wherein said reinforcing layer has a basis weight of from about 15 to about 160 grams per square meter.

56. The invention as set forth in claims 53 or 54 hereof wherein said weight is from about 20 to about 80 grams per square meter.

57. The invention as set forth in claims 53 or 54 hereof wherein said modification is achieved using a continuous modification pattern.

58. The invention as set forth in claims 53 or 54 hereof wherein said modification is achieved using a modified continuous pattern.

59. The invention as set forth in claims 53 or 54 hereof wherein said modification is achieved using a discontinuous modification pattern.

60. The invention as set forth in claims 53 or 54 hereof wherein said modification is achieved using a discontinuous modification pattern in combination with a continuous or a modified continuous pattern.

61. The invention as set forth in claims 53 or 54 hereof wherein said structure has a structural stability of not more than about 0.5%.

62. A process for preparing a flooring structure comprising a single reinforcing layer, said process comprising the steps of selecting a matrix material for said structure, said matrix material being capable of providing a desired basis weight for said structure, selecting a reinforcing layer, said layer having regions of differential relaxed compressive/tensile stiffness such that, when said structure is formed from said material and said layer, said structure will have a critical buckle strain greater than the subfloor dimensional change of a target subfloor, and embedding said reinforcing layer in said matrix material, whereby said structure will be suitable to accommodate the subfloor movement of said subfloor without buckling when said structure is disposed on said subfloor.

63. The invention as set forth in claim 62 hereof wherein said reinforcing layer is a glass reinforcing layer.

64. The invention as set forth in claim 63 hereof wherein said layer is non-woven.

65. The invention as set forth in claims 62, 63 or 64 hereof wherein said reinforcing layer comprises regions wherein said layer is physically interrupted.

66. The invention as set forth in claims 62, 63 or 64 hereof wherein said reinforcing layer comprises regions wherein said layer is chemically nodified.

67. The invention as set forth in claim 66 hereof wherein said chemically modified regions comprise at least one selectively applied binder.

68. The invention as set forth in claim 62 hereof wherein said regions of differential relaxed compressive/tensile stiffness are provided by selectively varying the regional fiber content of said layer.

69. The invention as set forth in claims 62 or 63 hereof wherein said structure has a structural stability of not more than about 0.5%.

70. A process for preparing a flooring structure comprising a single reinforcing layer, said process comprising the steps of selecting a target critical buckle strain for said structure, said target critical buckle strain being greater than the subfloor dimensional change of a target subfloor, selecting a reinforcing layer and a matrix material such that a floor covering having a desired basis weight can be produced, determining the critical buckle strain for a floor covering constructed from said layer and said material, imparting regions of differential relaxed compressive/tensile stiffness to said reinforcing layer, whereby when a structure is prepared from said modified layer and said matrix material, said structure will have a critical buckle strain which is not less than said target critical buckle strain, and constructing said flooring structure, whereby said structure will be suitable to accommodate the subfloor movement of said subfloor without buckling when said structure is disposed on said subfloor.

71. The invention as set forth in claim 70 hereof wherein said reinforcing layer is a glass reinforcing layer.

72. The invention as set forth in claim 71 hereof wherein said layer is non-woven.

73. The invention as set forth in claims 70, 71 or 72 hereof wherein said regions have reduced the relaxed compressive/tensile stiffness of said reinforcing layer.

74. The invention as set forth in claim 73 hereof wherein said reinforcing layer comprises regions wherein said layer is physically interrupted.

75. The invention as set forth in claim 73 hereof wherein said reinforcing layer comprises regions wherein said layer is chemically modified.

76. The invention as set forth in claims 70, 71 or 72 wherein said regions have increased the relaxed compressive/tensile stiffness of said reinforcing layer.

77. The invention as set forth in claim 76 hereof wherein said reinforcing layer comprises regions wherein said layer is chemically modified.

78. The invention as set forth in claim 77 hereof wherein said chemically modified regions comprise at least one selectively applied binder.

79. The invention as set forth in claim 70 hereof wherein said regions of differential relaxed compressive/tensile stiffness are provided by selectively varying the regional fiber content of said layer.

80. The invention as set forth in claim 70, 71 or 72 hereof wherein said structure has a structural stability of not more than about 0.5%.

81. A resilient loose-lay floor structure, said floor structure having a basis weight of from about 2 to about 10 pounds per square yard and comprising a matrix material and at least two layers of reinforcing material disposed within said matrix material, at least one of said layers being approximately above the neutral bending plane of said loose-lay floor structure and at least one of said layers being approximately below said neutral bending plane, the sum of the relaxed compressive stiffness values for said reinforcing materials being not less than the relaxed compressive stiffness value for said matrix material, said floor structure having a bending stiffness of from about 0.1 to about 9 inch-pounds and a critical buckle strain greater than the strain expected to be caused by a target subfloor dimensional change.

82. The invention as set forth in claim 81 hereof wherein said bending stiffness is from about 1 to about 9 inch-pounds, said subfloor having a subfloor dimensional change of not less than 0.0015.

83. The invention as set forth in claim 82 hereof wherein said bending stiffness is from about 3 to about 9 inch-pounds and said subfloor dimensional change is not less than 0.0030.

84. The invention as set forth in claim 81 hereof wherein the ratio of the sums of said relaxed compressive stiffness values for said reinforcing materials and said matrix material is at least 5 to 1.

85. The invention as set forth in claim 84 hereof wherein said ratio is at least 10 to 1.

86. The invention as set forth in claim 82 hereof wherein the ratio of the sums of said relaxed compressive stiffness values for said reinforcing materials and said matrix material is at least 5:1.

87. The invention as set forth in claim 86 hereof wherein said ratio is at least 10:1.

88. The invention as set forth in claim 83 hereof wherein the ratio of the sums of said relaxed compressive stiffness values for said reinforcing materials and said matrix material is at least 5:1.

89. The invention as set forth in claim 88 hereof wherein said ratio is at least 10:1.

90. The invention as set forth in claims 81, 82, 83, 84, 85, 86, 87, 88 or 89 hereof wherein said layers of reinforcing material have the same composition.

91. The invention as set forth in claims 81 82, 83, 84, 85, 86, 87, 88 or 89 hereof wherein said layers of reinforcing material have different compositions.

92. The invention as set forth in claims 81, 82, 83, 84, 85, 86, 87, 88 or 89 wherein each of said layers of reinforcing material is disposed within said matrix material in a substantially planar fashion.

93. The invention as set forth in claims 81, 82, 83, 84, 85, 86, 87, 88 or 89 hereof wherein a substantial portion of at least one of said reinforcing layers does not lie in the same plane.

94. The invention as set forth in claims 81, 82, 83, 84, 85, 86, 87, 88 or 89 hereof wherein the relaxed compressive stiffness of at least one of said reinforcing layers has been modified.

95. The invention as set forth in claim 94, hereof wherein said modification has been accomplished in situ.

96. A modified flooring structure comprising a single reinforcing layer, said structure having been produced by modifying in situ a flooring structure having a critical buckle strain which was less than the subfloor dimensional change of a target subfloor, said modified flooring structure having a critical buckle strain which is greater than said subfloor dimensional change, whereby said modified flooring structure is suitable to accommodate the subfloor movement of said target subfloor.

97. The invention as set forth in claim 96 hereof wherein said in situ modification was achieved by selecting a target critical buckle strain, said critical buckle strain being greater than said subfloor dimensional change;

determining the relaxed compressive stiffness, the bending stiffness and the basis weight of said flooring structure;

plotting a contour curve of the target critical buckle strain for said flooring structure by varying the bending stiffness values from about 0 to about 9 inch-pounds and by varying the relaxed compressive stiffness values from about 0 to about 10,000 pounds per inch of width;

determining from said contour curve the relaxed compressive stiffness required for said modified flooring structure; and modifying said flooring structure in situ such that the resulting modified flooring structure has a relaxed compressive stiffness value which is the same as or less than the target relaxed compressive stiffness.

98. The invention as set forth in claim 97, hereof wherein said reinforcing layer is a glass reinforcing layer.

99. The invention as set forth in claims 96, 97 or 98 hereof wherein said reinforcing layer has a basis weight of from about 15 to about 160 grams per square meter.

100. The invention as set forth in claim 99 hereof wherein said basis weight is from about 20 to about 80 grams per square meter.

101. The invention as set forth in claims 96, 97 or 98 hereof wherein said structure comprises a reinforcing layer having a continuous modification pattern.

102. The invention as set forth in claims 96, 97 or 98 hereof wherein said structure comprises a reinforcing layer having a modified continuous pattern.

103. The invention as set forth in claims 96, 97 or 98 hereof wherein said structure comprises a reinforcing layer having a discontinuous modification pattern.

104. The invention as set forth in claims 96, 97 or 98 hereof wherein said structure comprises a reinforcing layer having a discontinuous modification pattern in combination with a continuous or a modified continuous pattern.

105. The invention as set forth in claims 96, 97 or 98 hereof wherein said structure has a structural stability of not more than about 0.5%.

106. A surface covering which is suitable to be adhered with an adhesive to a target subsurface without buckling, said surface covering comprising (a) a matrix material, and (b) at least one reinforcing layer disposed therein which has been modified in situ such that *prior to modification, said surface covering and the selected adhesive provide an adhered critical buckle strain less than the subsurface dimensional change, and after modification said surface covering has a critical buckle strain which is less change, and after modification* said surface covering the subsurface dimensional change of said target subsurface, the difference between said critical buckle strain and said subsurface dimensional change being such that the adhesive strength of a selected adhesive in combination with the basis weight of said surface covering will be sufficient to provide an adhesive bond having a strength which is not less than the adhered basis weight calculated for said surface covering, whereby said surface covering is suitable to be adhered with said adhesive to said subsurface without buckling.

107. The invention as set forth in claim 106 hereof wherein said surface covering is produced by (a) selecting a surface covering comprising at least one reinforcing layer, the critical buckle strain of said selected covering being less than the subsurface dimensional change;

(b) selecting an adhesive having a determined adhesive strength;

(c) measuring the basis weight, the bending stiffness and the relaxed compressive stiffness of said selected covering;

(d) selecting a target critical buckle strain which is greater than the subsurface dimensional change;

(e) calculating the adhered basis weight which would be obtained if said selected covering were adhered to said subsurface using said adhesive;

(f) calculating the relaxed compressive stiffness for a modified surface covering having the measured bending stiffness, the calculated adhered basis weight, and a critical buckle strain which is equal to the target critical buckle strain, and (g) modifying said covering in situ such that it has a relaxed compressive stiffness value which is not greater than the calculated relaxed compressive stiffness value.

108. The invention as set forth in claim 106 hereof wherein said surface covering is obtained by (a) selecting a surface covering comprising at least one reinforcing layer, the critical buckle strain of said selected covering being less than the subsurface dimensional change;

(b) modifying said covering in situ such that the critical buckle strain of the modified covering is greater than the initially measured critical buckle strain, but less than the critical buckle strain which would equal or exceed the subsurface dimensional change;

(c) selecting a target critical buckle strain which is greater than the subsurface dimensional change;

(d) measuring the bending stiffness, relaxed compressive stiffness and basis weight of said modified covering;

(e) calculating the adhered basis weight for a covering having the measured bending stiffness, the measured relaxed compressive stiffness, and a critical buckle strain that is equal to the target critical buckle strain; and (f) calculating the minimum adhesive strength necessary to adhere said modified covering to said subsurface.

109. The invention as set forth in claim 106 hereof wherein said reinforcing layer is a glass reinforcing layer.

110. The invention as set forth in claims 106, 107, 108 or 109 hereof wherein said reinforcing layer has a basis weight of from about 15 to about 160 grams per square meter.

111. The invention as set forth in claim 110 hereof wherein said basis weight is from about 20 to about 80 grams per square meter.

112. The invention as set forth in claims 106, 107, 108 or 109 hereof wherein said modification is achieved using a continuous modification pattern.

113. The invention as set forth in claims 106, 107, 108 or 109 hereof wherein said modification is achieved using a modified continuous pattern.

114. The invention as set forth in claims 106, 107, 108 or 109 hereof wherein said modification is achieved using a discontinuous modification pattern.

115. The invention as set forth in claims 106, 107, 108 or 109 hereof wherein said modification is achieved using a discontinuous modification pattern in combination with a continuous or a modified continuous pattern.

116. The invention as set forth in claims 106, 107, 108 or 109 hereof wherein said structure has a structural stability of not more than about 0.5%.

117. A composite structure comprising a surface covering, a subsurface and an adhesive which adheres said surface covering and said subsurface together, said surface covering comprising (a) a matrix material, and (b) at least one reinforcing layer disposed therein which has been modified in situ, the critical buckle strain of said surface covering being less than the subsurface dimensional change of said subsurface, the difference between said critical buckle strain and said subsurface dimensional change being such that the adhesive strength of said adhesive in combination with the basis weight of said surface covering provides an adhesive bond having a strength which is not less than the adhered basis weight calculated for said surface covering.

118. The invention as set forth in claim 117 hereof wherein said composite structure is obtained by (a) selecting a surface covering comprising at least one reinforcing layer, the critical buckle strain of said selected covering being less than the subsurface dimensional change;

(b) selecting an adhesive having a determined adhesive strength;

(c) measuring the basis weight, the bending stiffness and the relaxed compressive stiffness of said selected covering;

(d) selecting a target critical buckle strain which is greater than the subfloor dimensional change;

(e) calculating the adhered basis weight which would be obtained if said selected covering were adhered to said subsurface using said adhesive;

(f) calculating the relaxed compressive stiffness for a modified surface covering having the measured bending stiffness, the calculated adhered basis weight, and a critical buckle strain which is equal to the target critical buckle strain;

(g) modifying said covering in situ such that it has a relaxed compressive stiffness value which is not greater than the calculated relaxed compressive stiffness value; and (h) adhering said surface covering to said subsurface using said selected adhesive.

119. The invention as set forth in claim 117 hereof wherein said composite structure is obtained by (a) selecting a surface covering comprising at least one reinforcing layer, the critical buckle strain of said selected covering being less than the subsurface dimensional change;

(b) modifying said covering in situ such that the critical buckle strain of the modified covering is greater than the initially measured critical buckle strain, but less than the critical buckle strain which would equal or exceed the subsurface dimensional change;

(c) selecting a target critical buckle strain which is greater than the subsurface dimensional change;

(d) measuring the bending stiffness, relaxed compressive stiffness and basis weight of said modified covering;

(e) calculating the adhered basis weight for a covering having the measured bending stiffness, the measured relaxed compressive stiffness, and a critical buckle strain which is equal to the target critical buckle strain;

(f) calculating the minimum adhesive strength necessary to adhere said modified covering to said subsurface;

(g) selecting an adhesive having an adhesive strength which is at least as great as said calculated adhesive strength; and (h) adhering said surface covering to said subsurface using said selected adhesive..

120. The invention as set forth in claim 117 hereof wherein said reinforcing layer is a glass reinforcing layer.

121. The invention as set forth in claims 117, 118, 119 or 120 hereof wherein said reinforcing layer has a basis weight of from about 15 to about 160 grams per square meter.

122. The invention as set forth in claim 121 hereof wherein said basis weight is from about 20 to about 80 grams per square meter.

123. The invention as set forth in claim 117, 118, 119 or 120 hereof wherein said modification is achieved using a continuous modification pattern.

124. The invention as set forth in claims 117, 118, 119 or 120 hereof wherein said modification is achieved using a modified continuous pattern.

125. The invention as set forth in claims 117, 118, 119 or 120 hereof wherein said modification is achieved using a discontinuous modification pattern.

126. The invention as set forth in claims 117, 118, 119 or 120 hereof wherein said modification is achieved using a discontinuous modification pattern in combination with a continuous or a modified continuous pattern.

127. The invention as set forth in claims 117, [99, 100 or 101] *118, 119 or 120* hereof wherein said structure has a structural stability of not more than about 0.5%.

128. A flooring structure, said structure comprising a matrix material, and a single reinforcing layer embedded within said matrix material, said layer comprising regions of differential relaxed compressive/tensile stiffness *wherein said reinforcing layer comprises regions in which said layer is physically interrupted or chemically modified* such that said structure has a critical buckle strain in excess of the subfloor dimensional change of a target subfloor, said structure being suitable to accommodate the movement of said subfloor without buckling when disposed over said subfloor.

129. The invention as set forth in claim 128 hereof wherein said reinforcing layer is a glass reinforcing layer.

130. The invention as set forth in claim 129 hereof wherein said layer is non-woven.

[131. The invention as set forth in claim 128, 129 or 130 hereof wherein said reinforcing layer comprises regions wherein said layer is physically interrupted.]

[132. The invention as set forth in claims 128, 129 or 130 hereof wherein said reinforcing layer comprises regions wherein said layer is chemically modified.]

133. The invention as set forth in [claim 132] *claims 128, 129 or 130* hereof wherein said chemically modified regions comprise at least one selectively applied binder.

134. The invention as set forth in claim 128 hereof wherein said regions of differential relaxed compressive/tensile stiffness are provided by selectively varying the regional fiber content of said layer.

135. The invention as set forth in claims 128 or 129 hereof wherein said structure has a structural stability of not more than about 0.5%.

* * * * *

UNITED STATES PATENT AND TRADEMARK OFFICE

CERTIFICATE OF CORRECTION

PATENT NO. : Re. 34,357

DATED : August 24, 1993

INVENTOR(S) : Donald C. Eckert et al.

It is certified that error appears in the above-indentified patent and that said Letters Patent is hereby corrected as shown below:

Claim 36, column 46, line 20, "claims 29, 45 or 46" should read --claims 29, [45 or 46] *30 or 31*--.

Claim 37, column 46, line 23, "claims 29, 45 or 46" should read --claims 29, [45 or 46] *30 or 31*--.

Claim 38, column 46, line 27, "claims 29, 45 or 46" should read --claims 29, [45 or 46] *30 or 31*--.

Claim 90, column 50, lines 40-41, "claims 81, 82, 83, 84, 85, 86, 87, 88 or 89" should read --claims 81, *82*, *83*, *84*, *85*, *86*, *87*, *88* or *89*--.

Claim 106, column 51, lines 35-37 "*said surface covering has a critical buckle strain which is less change, and after modification* said surface covering the subsurface" should read --said surface covering has a critical buckle strain which is less than the subsurface--.

Signed and Sealed this

Nineteenth Day of April, 1994

Bruce Lehman

*Attest:*

BRUCE LEHMAN

*Attesting Officer*

*Commissioner of Patents and Trademarks*